US012507031B2

(12) United States Patent
Laitinen et al.

(10) Patent No.: US 12,507,031 B2

(45) Date of Patent: Dec. 23, 2025

(54) AUDIO RENDERING WITH SPATIAL METADATA INTERPOLATION AND SOURCE POSITION INFORMATION

(71) Applicant: Nokia Technologies Oy, Espoo (FI)

(72) Inventors: Mikko-Ville Laitinen, Espoo (FI); Juha Vilkamo, Helsinki (FI); Archontis Politis, Tampere (FI); Antti Eronen, Tampere (FI); Leo McCormack, Espoo (FI)

(73) Assignee: Nokia Technologies Oy, Espoo (FI)

(*) Notice: Subject to any disclaimer, the term of this patent is extended or adjusted under 35 U.S.C. 154(b) by 156 days.

(21) Appl. No.: 18/268,386

(22) PCT Filed: Nov. 30, 2021

(86) PCT No.: PCT/FI2021/050825

§ 371 (c)(1),
(2) Date: Jun. 20, 2023

(87) PCT Pub. No.: WO2022/136725

PCT Pub. Date: Jun. 30, 2022

(65) Prior Publication Data

US 2024/0305947 A1 Sep. 12, 2024

(30) Foreign Application Priority Data

Dec. 21, 2020 (GB) ...................................... 2020239

(51) Int. Cl.
*H04S 7/00* (2006.01)

(52) U.S. Cl.
CPC .......... *H04S 7/304* (2013.01); *H04S 2400/15* (2013.01); *H04S 2420/11* (2013.01)

(58) Field of Classification Search
CPC ... H04S 7/304; H04S 2400/05; H04S 2420/11
USPC ...................................................... 381/1, 303
See application file for complete search history.

(56) References Cited

U.S. PATENT DOCUMENTS

2003/0035553 A1* 2/2003 Baumgarte ............... H04S 3/00 381/2
2013/0142342 A1 6/2013 Del Galdo et al. ............. 381/56
2017/0140764 A1* 5/2017 Wuebbolt ............... H04S 3/008
2017/0180905 A1* 6/2017 Purnhagen ............ G10L 19/008
2019/0230436 A1 7/2019 Tsingos et al.
(Continued)

FOREIGN PATENT DOCUMENTS

WO WO-2013/079663 A2 6/2013

*Primary Examiner* — William J Deane, Jr.

(74) *Attorney, Agent, or Firm* — McCarter & English LLP

(57) ABSTRACT

An apparatus including circuitry configured to: obtain two or more audio signal sets, wherein each audio signal set is associated with a position; obtain at least one parameter value for at least two of the audio signal sets; obtain the positions associated with the at least two of the audio signal sets; obtain a listener position; obtain source position information; obtain values related to source energies associated with the source position information; generate at least one audio signal based on at least one audio signal from at least one of the audio signal sets based on the positions associated with the at least two of the audio signal sets and the listener position; generate at least one modified parameter value and a residual value; and process the at least one audio signal to generate a spatial audio output.

20 Claims, 16 Drawing Sheets

(56) References Cited

U.S. PATENT DOCUMENTS

| | | | |
|---|---|---|---|
| 2020/0154229 A1 | 5/2020 | Habets et al. | |
| 2020/0228913 A1* | 7/2020 | Herre | G10L 19/008 |
| 2020/0260206 A1 | 8/2020 | Vilkamo et al. | |
| 2024/0305947 A1* | 9/2024 | Laitinen | H04S 7/304 |

* cited by examiner

AUDIO RENDERING WITH SPATIAL METADATA INTERPOLATION AND SOURCE POSITION INFORMATION

CROSS REFERENCE TO RELATED APPLICATION

This patent application is a U.S. National Stage application of International Patent Application Number PCT/FI2021/050825 filed Nov. 30, 2021, which is hereby incorporated by reference in its entirety, and claims priority to GB 2020239.6 filed Dec. 21, 2020.

FIELD

The present application relates to apparatus and methods for audio rendering with spatial metadata interpolation and source position information, but not exclusively for audio rendering with spatial metadata interpolation for 6 degree of freedom systems.

BACKGROUND

Spatial audio capture approaches attempt to capture an audio environment such that the audio environment can be perceptually recreated to a listener in an effective manner and furthermore may permit a listener to move and/or rotate within the recreated audio environment. For example in some systems (3 degrees of freedom—3DoF) the listener may rotate their head and the rendered audio signals reflect this rotation motion. In some systems (3 degrees of freedom plus—3DoF+) the listener may 'move' slightly within the environment as well as rotate their head and in others (6 degrees of freedom—6DoF) the listener may freely move within the environment and rotate their head.

Linear spatial audio capture refers to audio capture methods where the processing does not adapt to the features of the captured audio. Instead, the output is a predetermined linear combination of the captured audio signals.

For recording spatial sound linearly at one position at the recording space, a high-end microphone array is needed. One such microphone is the spherical 32-microphone Eigenmike. From the high-end microphone array a higher-order Ambisonics (HOA) signals can be obtained and used for linear rendering. With the HOA signals, the spatial audio can be linearly rendered so that sounds arriving from different directions are satisfactorily separated in a reasonable auditory bandwidth.

An issue for linear spatial audio capture techniques are the requirements for the microphone arrays. Short wavelengths (higher frequency audio signals) need small microphone spacing, and long wavelengths (lower frequency) need a large array size, and it is difficult to meet both conditions within a single microphone array.

Most practical capture devices (for example virtual reality cameras, single lens reflex cameras, mobile phones) are not equipped with the microphone array such as provided by the Eigenmike and do not have a sufficient microphone arrangement for linear spatial audio capture. Furthermore implementing linear spatial audio capture for capture devices results in a spatial audio obtained only for a single position.

Parametric spatial audio capture refers to systems that estimate perceptually relevant parameters based on the audio signals captured by microphones and, based on these parameters and the audio signals, a spatial sound may be synthesized. The analysis and the synthesis typically takes place in frequency bands which may approximate human spatial hearing resolution.

It is known that for the majority of compact microphone arrangements (e.g., VR-cameras, multi-microphone arrays, mobile phones with microphones, SLR cameras with microphones) parametric spatial audio capture may produce a perceptually accurate spatial audio rendering, whereas the linear approach does not typically produce a feasible result in terms of the spatial aspects of the sound. For high-end microphone arrays, such as the Eigenmike, the parametric approach may furthermore provide on average a better quality spatial sound perception than a linear approach.

SUMMARY

There is provided according to a first aspect an apparatus comprising means configured to: obtain two or more audio signal sets, wherein the two or more audio signal sets are associated with a respective audio signal set position; obtain, for at least one parameter associated with the two or more audio signal sets, at least one parameter value for each of at least two of the two or more audio signal sets; obtain the respective audio signal set positions associated with the at least two of the at least two or more audio signal sets; obtain a listener position, wherein the listener position is configured to define at least partially a listener within an audio environment, wherein the audio environment comprises positions between and around the respective audio signal set positions associated with the two or more audio signal sets; obtain sound source position information; obtain values related to sound source energies associated with the sound source position information; generate at least one audio signal based on at least one audio signal from at least one of the two or more audio signal sets based on the respective audio signal set positions associated with the at least two of the two or more audio signal sets and the listener position; generate at least one modified parameter value and a residual value based on the obtained at least one parameter value for the at least two of the two or more audio signal sets, the respective audio signal set positions associated with the at least two of the two or more audio signal sets, the sound source position information, the values related to the sound source energies and the listener position; and process the at least one audio signal based on the at least one modified parameter value, the residual value, the sound source position information, the values related to the sound source energies associated with the sound source position information to generate a spatial audio output.

The means configured to obtain two or more audio signal sets may be configured to obtain the two or more audio signal sets from microphone arrangements, wherein each microphone arrangement is at a respective position and comprises one or more microphones.

Each audio signal set may be associated with a respective audio signal set orientation and the means may further be configured to obtain the respective audio signal set orientations of the two or more audio signal sets, wherein the generated at least one audio signal may be further based on the respective audio signal set orientations associated with the two or more audio signal sets, and wherein the at least one modified parameter value may be further based on the respective audio signal set orientations associated with the two or more audio signal sets.

The means may be further configured to obtain a listener orientation, wherein the listener orientation may be configured to further define the listener within the at least partially six-degrees-of-freedom environment, wherein the at least one modified parameter value may be further based on the listener orientation.

The means may be further configured to obtain a listener orientation, wherein the listener orientation may be configured to further define the listener within the at least partially six-degrees-of-freedom environment and wherein the means configured to process the at least one audio signal based on the at least one modified parameter value, the residual value, the sound source position information, the values related to source energies associated with the sound source position information to generate a spatial audio output may be further configured to process the at least one audio signal further based on the listener orientation.

The means may be further configured to obtain control parameters based on the respective audio signal set positions associated with the at least two of the audio signal sets and the listener position, wherein the means configured to generate at least one audio signal based on at least one audio signal from at least one of the two or more audio signal sets based on the respective audio signal set positions associated with the at least two of the audio signal sets and the listener position may be controlled based on the control parameters.

The means configured to generate the at least one modified parameter value may be controlled based on the control parameters.

The means configured to obtain control parameters may be configured to: identify at least three of the audio signal sets within which the listener position is located and generate weights associated with the at least three of the audio signal sets based on the audio signal set positions and the listener position; and otherwise identify two or more of the audio signal sets closest to the listener position and generate weights associated with the two or more of the audio signal sets based on the audio signal set positions and a perpendicular projection of the listener position from a line or plane between the two or more of the audio signal sets.

The means configured to generate at least one audio signal may be configured to perform one of: combine two or more audio signals from two or more audio signal sets based on the weights; select one or more audio signal from one of the two or more audio signal sets based on which of the two or more audio signal sets is closest to the listener position; and select one or more audio signal from one of the two or more audio signal sets based on which of the two or more audio signal sets is closest to the listener position and a further switching threshold.

The means configured to generate the at least one modified parameter value may be configured to combine the obtained at least one parameter value for at least two of the two or more audio signal sets based on the weights.

The means configured to process the at least one audio signal based on the at least one modified parameter value to generate a spatial audio output may be configured to generate at least one of: a binaural audio output comprising two audio signals for headphones and/or earphones; and a multichannel audio output comprising at least two audio signals for a multichannel speaker set.

The at least one parameter value may comprise at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

The at least two of the audio signal sets may comprise at least two audio signals, and the means configured to obtain the at least one parameter value may be configured to spatially analyse the two or more audio signals from the two or more audio signal sets to determine the at least one parameter value.

The means configured to obtain the at least one parameter value may be configured to receive or retrieve the at least one parameter value for at least two of the audio signal sets.

The sound source position information may be based on at least one prominent sound source.

The at least one prominent sound source may be a sound source with an energy greater than a threshold value.

The means configured to obtain sound source position information may be configured to: receive at least one user input defining sound source position information; receive position tracker information defining source position information; determine sound source position information based on the two or more audio signal sets.

The values related to sound source energies may comprise one of: sound source energy values; sound source amplitude values; sound source level values; and sound source prominence values.

The residual value may comprise an residual energy value.

The means configured to generate at least one audio signal based on at least one audio signal from at least one of the two or more audio signal sets based on the respective audio signal set positions associated with the at least two of the two or more audio signal sets and the listener position may be configured to select the at least one audio signal from at least one of the two or more audio signal sets based on the respective audio signal set positions associated with the at least two of the two or more audio signal sets and the listener position.

According to a second aspect there is provided a method for an apparatus comprising: obtaining two or more audio signal sets, wherein the two or more audio signal sets are associated with a respective audio signal set position; obtaining, for at least one parameter associated with the two or more audio signal sets, at least one parameter value for at least two of the two or more audio signal sets; obtaining the respective audio signal set positions associated with the at least two of the at least two or more audio signal sets; obtaining a listener position, wherein the listener position is configured to define at least partially a listener within an audio environment, wherein the audio environment comprises positions between and around the respective audio signal set positions associated with the two or more audio signal sets; obtaining sound source position information; obtaining values related to sound source energies associated with the sound source position information; generating at least one audio signal based on at least one audio signal from at least one of the two or more audio signal sets based on the respective audio signal set positions associated with the at least two of the two or more audio signal sets and the listener position; generating at least one modified parameter value and a residual value based on the obtained at least one parameter value for the at least two of the two or more audio signal sets, the respective audio signal set positions associated with the at least two of the two or more audio signal sets, the sound source position information, the values related to sound source energies and the listener position; and processing the at least one audio signal based on the at least one modified parameter value, the residual value, the sound source position information, the values related to sound source energies associated with the sound source position information to generate a spatial audio output.

Obtaining two or more audio signal sets may comprise obtaining the two or more audio signal sets from microphone arrangements, wherein each microphone arrangement is at a respective position and comprises one or more microphones.

Each audio signal set may be associated with a respective audio signal set orientation and the method may further comprise obtaining the respective audio signal set orientations of the two or more audio signal sets, wherein generating the at least one audio signal may further be based on the respective audio signal set orientations associated with the two or more audio signal sets, and wherein the at least one modified parameter value may be further based on the respective audio signal set orientations associated with the two or more audio signal sets.

The method may further comprise obtaining a listener orientation, wherein the listener orientation may be configured to further define the listener within the at least partially six-degrees-of-freedom environment, wherein the at least one modified parameter value may be further based on the listener orientation.

The method may further comprise obtaining a listener orientation, wherein the listener orientation may be configured to further define the listener within the at least partially six-degrees-of-freedom environment and wherein processing the at least one audio signal based on the at least one modified parameter value, the residual value, the sound source position information, the values related to the sound source energies associated with the sound source position information to generate a spatial audio output may further comprise processing the at least one audio signal further based on the listener orientation.

The method may further comprise obtaining control parameters based on the respective audio signal set positions associated with the at least two of the audio signal sets and the listener position, wherein generating at least one audio signal based on at least one audio signal from at least one of the two or more audio signal sets based on the respective audio signal set positions associated with the at least two of the audio signal sets and the listener position may be controlled based on the control parameters.

Generating the at least one modified parameter value may be controlled based on the control parameters.

Obtaining control parameters may comprise: identifying at least three of the audio signal sets within which the listener position is located and generate weights associated with the at least three of the audio signal sets based on the audio signal set positions and the listener position; and otherwise identifying two or more of the audio signal sets closest to the listener position and generate weights associated with the two or more of the audio signal sets based on the audio signal set positions and a perpendicular projection of the listener position from a line or plane between the two or more of the audio signal sets.

Generating at least one audio signal may comprise one of: combining two or more audio signals from two or more audio signal sets based on the weights; selecting one or more audio signal from one of the two or more audio signal sets based on which of the two or more audio signal sets is closest to the listener position; and selecting one or more audio signal from one of the two or more audio signal sets based on which of the two or more audio signal sets is closest to the listener position and a further switching threshold.

Generating the at least one modified parameter value may comprise combining the obtained at least one parameter value for at least two of the two or more audio signal sets based on the weights.

Processing the at least one audio signal based on the at least one modified parameter value to generate a spatial audio output may comprise generating at least one of: a binaural audio output comprising two audio signals for headphones and/or earphones; and a multichannel audio output comprising at least two audio signals for a multichannel speaker set.

The at least one parameter value may comprise at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

The at least two of the audio signal sets may comprise at least two audio signals, and obtaining the at least one parameter value may comprise spatially analysing the two or more audio signals from the two or more audio signal sets to determine the at least one parameter value.

Obtaining the at least one parameter value may comprise receiving or retrieving the at least one parameter value for at least two of the audio signal sets.

The sound source position information may be based on at least one prominent sound source.

The at least one prominent sound source may be a sound source with an energy greater than a threshold value.

Obtaining sound source position information may comprise: receiving at least one user input defining sound source position information; receiving position tracker information defining sound source position information; determining sound source position information based on the two or more audio signal sets.

The values related to the sound source energies may comprise one of: sound source energy values; sound source amplitude values; sound source level values; and sound source prominence values.

The residual value may comprise an residual energy value.

Generating at least one audio signal based on at least one audio signal from at least one of the two or more audio signal sets based on the respective audio signal set positions associated with the at least two of the two or more audio signal sets and the listener position may comprise selecting the at least one audio signal from at least one of the two or more audio signal sets based on the respective audio signal set positions associated with the at least two of the two or more audio signal sets and the listener position.

According to a third aspect there is provided an apparatus comprising at least one processor and at least one memory including a computer program code, the at least one memory and the computer program code configured to, with the at least one processor, cause the apparatus at least to: obtain two or more audio signal sets, wherein the two or more audio signal sets are associated with a respective audio signal set position; obtain, for at least one parameter associated with the two or more audio signal sets, at least one parameter value for each of at least two of the two or more audio signal sets; obtain the respective audio signal set positions associated with the at least two of the at least two or more audio signal sets; obtain a listener position, wherein the listener position is configured to define at least partially a listener within an audio environment, wherein the audio environment comprises positions between and around the respective audio signal set positions associated with the two or more audio signal sets; obtain sound source position information; obtain values related to sound source energies associated with the sound source position information; generate at least one audio signal based on at least one audio signal from at least one of the two or more audio signal sets based on the respective audio signal set positions associated with the at least two of the two or more audio signal sets and the listener position; generate at least one modified parameter value and a residual value based on the obtained at least one parameter value for the at least two of the two or more audio signal sets, the respective audio signal set positions associated with the at least two of the two or more audio signal sets, the sound source position information, the values related to the sound source energies and the listener position; and process the at least one audio signal based on the at least one modified parameter value, the residual value, the sound source position information, the values related to the sound source energies associated with the sound source position information to generate a spatial audio output The apparatus caused to obtain two or more audio signal sets may be further caused to obtain the two or more audio signal sets from microphone arrangements, wherein each microphone arrangement is at a respective position and comprises one or more microphones.

Each audio signal set may be associated with a respective audio signal set orientation and the apparatus may further be caused to obtain the respective audio signal set orientations of the two or more audio signal sets, wherein the apparatus caused to generate at least one audio signal may be further caused to generate the at least one audio signals based on the respective audio signal set orientations associated with the two or more audio signal sets, and wherein the at least one modified parameter value may be further based on the respective audio signal set orientations associated with the two or more audio signal sets.

The apparatus may be further caused to obtain a listener orientation, wherein the listener orientation may be configured to further define the listener within the at least partially six-degrees-of-freedom environment, wherein the at least one modified parameter value may be further based on the listener orientation.

The apparatus may be further caused to obtain a listener orientation, wherein the listener orientation may be configured to further define the listener within the at least partially six-degrees-of-freedom environment and wherein the apparatus caused to process the at least one audio signal based on the at least one modified parameter value, the residual value, the sound source position information, the values related to the sound source energies associated with the sound source position information to generate a spatial audio output may be further caused to process the at least one audio signal further based on the listener orientation.

The apparatus may be further caused to obtain control parameters based on the respective audio signal set positions associated with the at least two of the audio signal sets and the listener position, wherein the apparatus caused to generate at least one audio signal based on at least one audio signal from at least one of the two or more audio signal sets based on the respective audio signal set positions associated with the at least two of the audio signal sets and the listener position may be caused to be controlled based on the control parameters.

The apparatus caused to generate the at least one modified parameter value may be caused to be controlled based on the control parameters.

The apparatus caused to obtain control parameters may be further caused to: identify at least three of the audio signal sets within which the listener position is located and generate weights associated with the at least three of the audio signal sets based on the audio signal set positions and the listener position; and otherwise identify two or more of the audio signal sets closest to the listener position and generate weights associated with the two or more of the audio signal sets based on the audio signal set positions and a perpendicular projection of the listener position from a line or plane between the two or more of the audio signal sets.

The apparatus caused to generate at least one audio signal may be caused to perform one of: combine two or more audio signals from two or more audio signal sets based on the weights; select one or more audio signal from one of the two or more audio signal sets based on which of the two or more audio signal sets is closest to the listener position; and select one or more audio signal from one of the two or more audio signal sets based on which of the two or more audio signal sets is closest to the listener position and a further switching threshold.

The apparatus caused to generate the at least one modified parameter value may be caused to combine the obtained at least one parameter value for at least two of the two or more audio signal sets based on the weights.

The apparatus caused to process the at least one audio signal based on the at least one modified parameter value to generate a spatial audio output may be caused to generate at least one of: a binaural audio output comprising two audio signals for headphones and/or earphones; and a multichannel audio output comprising at least two audio signals for a multichannel speaker set.

The at least one parameter value may comprise at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

The at least two of the audio signal sets may comprise at least two audio signals, and the apparatus caused to obtain the at least one parameter value may be caused to spatially analyse the two or more audio signals from the two or more audio signal sets to determine the at least one parameter value.

The apparatus caused to obtain the at least one parameter value may be caused to receive or retrieve the at least one parameter value for at least two of the audio signal sets.

The source position information may be based on at least one prominent sound source.

The at least one prominent sound source may be a sound source with an energy greater than a threshold value.

The apparatus caused to obtain sound source position information may be further caused to: receive at least one user input defining sound source position information; receive position tracker information defining sound source position information; determine sound source position information based on the two or more audio signal sets.

The values related to the sound source energies may comprise one of: sound source energy values; sound source amplitude values; sound source level values; and sound source prominence values.

The residual value may comprise an residual energy value.

The apparatus caused to generate at least one audio signal based on at least one audio signal from at least one of the two or more audio signal sets based on the respective audio signal set positions associated with the at least two of the two or more audio signal sets and the listener position may be caused to select the at least one audio signal from at least one of the two or more audio signal sets based on the respective audio signal set positions associated with the at least two of the two or more audio signal sets and the listener position.

According to a fourth aspect there is provided an apparatus comprising: means for obtaining two or more audio signal sets, wherein the two or more audio signal sets are associated with a respective audio signal set position; means for obtaining, for at least one parameter associated with the two or more audio signal sets, at least one parameter value for at least two of the two or more audio signal sets; means for obtaining the respective audio signal set positions associated with the at least two of the at least two or more audio signal sets; means for obtaining a listener position, wherein the listener position is configured to define at least partially a listener within an audio environment, wherein the audio environment comprises positions between and around the respective audio signal set positions associated with the two or more audio signal sets; means for obtaining sound source position information; means for obtaining values related to sound source energies associated with the sound source position information; means for generating at least one audio signal based on at least one audio signal from at least one of the two or more audio signal sets based on the respective audio signal set positions associated with the at least two of the two or more audio signal sets and the listener position; means for generating at least one modified parameter value and a residual value based on the obtained at least one parameter value for the at least two of the two or more audio signal sets, the respective audio signal set positions associated with the at least two of the two or more audio signal sets, the sound source position information, the values related to sound source energies and the listener position; and means for processing the at least one audio signal based on the at least one modified parameter value, the residual value, the sound source position information, the values related to the sound source energies associated with the source position information to generate a spatial audio output.

According to a fifth aspect there is provided a computer program comprising instructions [or a computer readable medium comprising program instructions] for causing an apparatus to perform at least the following: obtaining two or more audio signal sets, wherein the two or more audio signal sets are associated with a respective audio signal set position; obtaining, for at least one parameter associated with the two or more audio signal sets, at least one parameter value for at least two of the two or more audio signal sets; obtaining the respective audio signal set positions associated with the at least two of the at least two or more audio signal sets; obtaining a listener position, wherein the listener position is configured to define at least partially a listener within an audio environment, wherein the audio environment comprises positions between and around the respective audio signal set positions associated with the two or more audio signal sets; obtaining sound source position information; obtaining values related to sound source energies associated with the sound source position information; generating at least one audio signal based on at least one audio signal from at least one of the two or more audio signal sets based on the respective audio signal set positions associated with the at least two of the two or more audio signal sets and the listener position; generating at least one modified parameter value and a residual value based on the obtained at least one parameter value for the at least two of the two or more audio signal sets, the respective audio signal set positions associated with the at least two of the two or more audio signal sets, the sound source position information, the values related to sound source energies and the listener position; and processing the at least one audio signal based on the at least one modified parameter value, the residual value, the sound source position information, the values related to the sound source energies associated with the sound source position information to generate a spatial audio output.

According to a sixth aspect there is provided a non-transitory computer readable medium comprising program instructions for causing an apparatus to perform at least the following: obtaining two or more audio signal sets, wherein the two or more audio signal sets are associated with a respective audio signal set position; obtaining, for at least one parameter associated with the two or more audio signal sets, at least one parameter value for at least two of the two or more audio signal sets; obtaining the respective audio signal set positions associated with the at least two of the at least two or more audio signal sets; obtaining a listener position, wherein the listener position is configured to define at least partially a listener within an audio environment, wherein the audio environment comprises positions between and around the respective audio signal set positions associated with the two or more audio signal sets; obtaining sound source position information; obtaining values related to sound source energies associated with the sound source position information; generating at least one audio signal based on at least one audio signal from at least one of the two or more audio signal sets based on the respective audio signal set positions associated with the at least two of the two or more audio signal sets and the listener position; generating at least one modified parameter value and a residual value based on the obtained at least one parameter value for the at least two of the two or more audio signal sets, the respective audio signal set positions associated with the at least two of the two or more audio signal sets, the sound source position information, the values related to sound source energies and the listener position; and processing the at least one audio signal based on the at least one modified parameter value, the residual value, the sound source position information, the values related to the sound source energies associated with the sound source position information to generate a spatial audio output.

According to a seventh aspect there is provided an apparatus comprising: obtaining circuitry configured to obtain two or more audio signal sets, wherein the two or more audio signal sets are associated with a respective audio signal set position; obtaining circuitry configured to obtain, for at least one parameter associated with the two or more audio signal sets, at least one parameter value for at least two of the two or more audio signal sets; obtaining circuitry configured to obtain the respective audio signal set positions associated with the at least two of the at least two or more audio signal sets; obtaining circuitry configured to obtain a listener position, wherein the listener position is configured to define at least partially a listener within an audio environment, wherein the audio environment comprises positions between and around the respective audio signal set positions associated with the two or more audio signal sets; obtaining circuitry configured to obtain sound source position information; obtaining circuitry configured to obtain values related to sound source energies associated with the sound source position information; generating circuitry configured to generate at least one audio signal based on at least one audio signal from at least one of the two or more audio signal sets based on the respective audio signal set positions associated with the at least two of the two or more audio signal sets and the listener position; generating circuitry configured to generate at least one modified parameter value and a residual value based on the obtained at least one parameter value for the at least two of the two or more audio signal sets, the respective audio signal set positions associated with the at least two of the two or more audio signal sets, the sound source position information, the values related to the sound source energies and the listener position; and processing circuitry configured to process the at least one audio signal based on the at least one modified parameter value, the residual value, the sound source position information, the values related to the sound source energies associated with the sound source position information to generate a spatial audio output.

According to an eighth aspect there is provided a computer readable medium comprising program instructions for causing an apparatus to perform at least the following: obtain two or more audio signal sets, wherein the two or more audio signal sets are associated with a respective audio signal set position; obtain, for at least one parameter associated with the two or more audio signal sets, at least one parameter value for each of at least two of the two or more audio signal sets; obtain the respective audio signal set positions associated with the at least two of the at least two or more audio signal sets; obtain a listener position, wherein the listener position is configured to define at least partially a listener within an audio environment, wherein the audio environment comprises positions between and around the respective audio signal set positions associated with the two or more audio signal sets; obtain sound source position information; obtain values related to sound source energies associated with the sound source position information; generate at least one audio signal based on at least one audio signal from at least one of the two or more audio signal sets based on the respective audio signal set positions associated with the at least two of the two or more audio signal sets and the listener position; generate at least one modified parameter value and a residual value based on the obtained at least one parameter value for the at least two of the two or more audio signal sets, the respective audio signal set positions associated with the at least two of the two or more audio signal sets, the sound source position information, the values related to the sound source energies and the listener position; and process the at least one audio signal based on the at least one modified parameter value, the residual value, the sound source position information, the values related to the sound source energies associated with the sound source position information to generate a spatial audio output.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The concept as discussed herein in further detail with respect to the following embodiments is related to parametric spatial audio capturing with two or more microphone arrays corresponding to different positions at the recording space (or in other words audio signal sets which are captured at respective signal set positions in the recording space) and to enabling the user to move to different positions at the captured sound scene, in other words, the present invention relates to 6DoF audio capture and rendering. However in some embodiments where there are three or more microphone arrays there may be circumstances where at the three or more microphone arrays are located at at least two (or more where there are more than three microphone arrays) different positions in the recording space.

6DoF is presently a commonplace in virtual reality, such as VR games, where movement at the audio scene is straightforward to render as all spatial information is readily available (i.e., the position of each sound source as well as the audio signal of each source separately). The present invention relates to providing robust 6DoF capturing and rendering also to spatial audio captured with microphone arrays.

6DoF capturing and rendering from microphone arrays is relevant, e.g., for the upcoming MPEG-I audio standard, where there is a requirement of 6DoF rendering of HOA signals. These HOA signals may be obtained from microphone arrays at a sound scene.

In the following examples the audio signal sets are generated by microphones. For example a microphone arrangement may comprise one or more microphones and generate for the audio signal set one or more audio signals. In some embodiments the audio signal set comprises audio signals which are virtual or generated audio signals (for example a virtual speaker audio signal with an associated virtual speaker location). In some embodiments the microphones are located away from the processing apparatus, however this does not preclude examples where the microphones are located on the processing apparatus or are physically connected to the processing apparatus.

Figure 1:
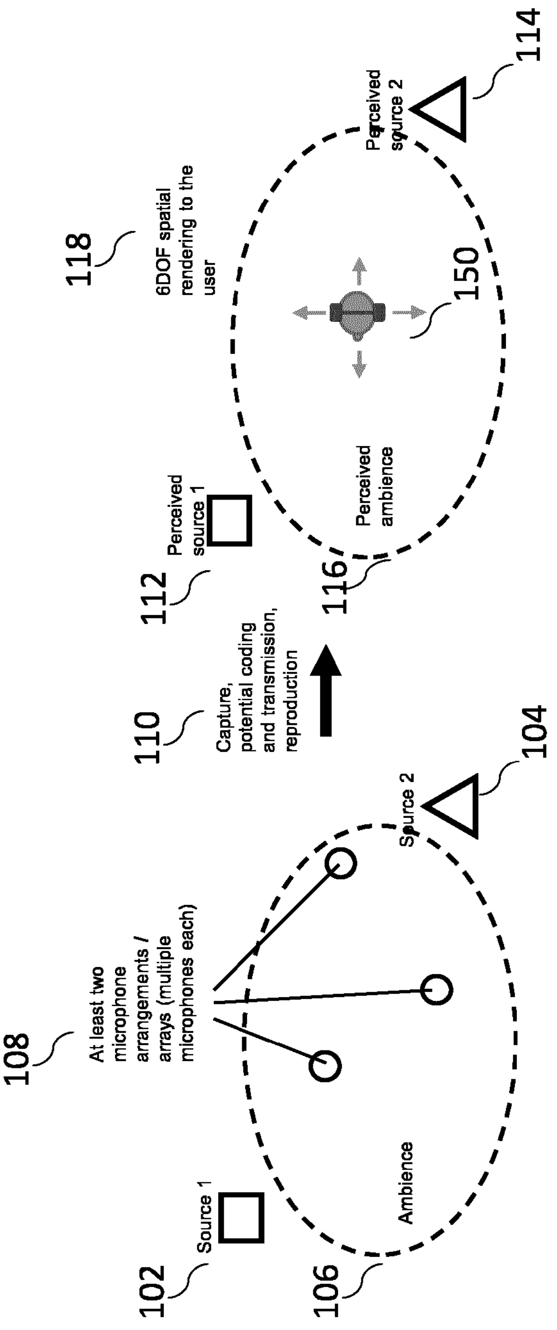
FIG. 1 shows schematically a system of apparatus suitable for implementing some embodiments.

Before discussing the concept in further detail we will initially describe in further detail some aspects of spatial capture and reproduction. For example with respect to FIG. 1 is shown an example of spatial capture and playback. Thus for example FIG. 1 shows on the left hand side a spatial audio signal capture environment. The environment or audio scene comprises sound sources, source 1 102 and source 2 104 which may be actual sources of audio signals or may be abstract representations of sound or audio sources. In other words the sound source or source may represent an actual source of sound, such as a musical instrument or represent an abstract source of sound, for example an distributed sound of wind passing through trees. Furthermore is shown non-directional or non-specific location ambience part 106. These can be captured by at least two microphone arrangements/arrays which can comprise two or more microphones each.

The audio signals can as described above be captured and furthermore may be encoded, transmitted, received and reproduced as shown in FIG. 1 by arrow 110.

An example reproduction is shown on the right hand side of FIG. 1. The reproduction of the spatial audio signals results in the user 150, which in this example is shown wearing head-tracking headphones being presented with a reproduced audio environment in the form of a 6DoF spatial rendering 118 which comprises a perceived source 1 112, a perceived source 2 114 and perceived ambience 116.

As discussed above, conventional linear and parametric spatial audio capture methods for microphone arrays can be used for high-quality spatial audio processing, depending on the available microphone arrangement. However, they both are developed for single position capturing and rendering. In other words the listener cannot move in between microphone arrays. Thus, they are not directly applicable for 6DOF rendering, where the listener may freely move in between the microphone arrays.

Recently 6DoF reproduction methods allowing free movement have been proposed where spatial metadata comprising directions and ratios in frequency bands, is determined from analysis of audio signals from at least two microphone arrays. In the renderer, 6DoF audio can then be rendered using the microphone-array signals and the spatial metadata, by interpolating the spatial metadata based on the listener position and orientation.

However in such an approach all the directional information is based on the time-frequency analysis of the microphone-array signals. As the sound scene typically contains multiple sources and/or reverberation, the directional estimates are a superposition of the contribution from all the sources and the reverberation, and thus do not necessarily point to any actual source of the audio signals. As a result, especially when such spatial metadata that is interpolated to a 6DOF listening position is used for rendering, the sound sources are not always perceived as point-like as the original sound sources, but instead as wider and/or having a vague direction. Moreover, two sources may "draw" each other, resulting in the sources being perceived at positions somewhere in between them instead of the actual places.

This kind of directional inaccuracy is a well-known problem with parametric spatial audio in general. For example it can also occur in 3DoF and non-tracked rendering when the listener position is not tracked. This directional inaccuracy may produce various negative effects. Thus for example a listener may not be fully engaged when experiencing the inaccuracy as the typical listener will pay more attention to point-like stable sources than sources having vague and wide directions. Furthermore fluctuating directions can be experienced as an artefact within the audio scene and decrease the naturalness of the reproduction.

Additionally accurate rendering of the spatial audio for listener positions outside the area covered by the microphone arrays is not possible using only the known method of interpolating spatial metadata based on the microphone array signals. As source positions are rendered based on the information on the edge of the area spanned by the microphone arrays, directional errors are created when the listener moves outside the area.

Although the perceptually relevant parameters can be any suitable parameters the following examples discussed herein obtain the following parameter set:

at least one direction parameter in frequency bands indicating the prominent (or dominant or perceptual) direction(s) where the sound arrives from, and a ratio parameter, for each direction parameter, indicating how much energy arrives from those direction(s) and how much of the sound energy is ambience/surrounding.

As discussed above there are different methods to obtain these parameters. A known method is Directional Audio Coding (DirAC), in which, based on a 1st order Ambisonic signal (or a B-format signal), a direction and a diffuseness (i.e., ambient-to-total energy ratio) parameter is estimated in frequency bands. In the following examples DirAC is used as a main example of parameter generation, although it is known that it is replaceable with other methods to obtain spatial parameters or spatial metadata such as, Higher-order DirAC, High-angular planewave expansion, and Nokia's spatial audio capture (SPAC) as discussed in PCT application WO2018/091776.

The embodiments as discussed herein may relate to 6-degree-of-freedom (i.e., the listener can move within the scene and the listener position is tracked) binaural rendering of audio captured with at least two microphone arrays in known positions. In other words in the embodiments described herein the listener may be able to move in between and around the respective audio signal set positions associated with the audio signal sets (for example such as generated by the microphone arrays). As such in some embodiments the ability to move in between and around the respective audio signal set positions may include the ability to move on a plane (omitting elevation), move on a line (omitting two axes) and move in 3D (including elevation). Thus for example a listener sitting or standing up may or may not be considered a different position, depending on if the renderer has (or uses) the elevation information.

Additionally these embodiments may comprise a method that uses information on the prominent sound source positions to guide parametric audio processing for achieving 6DoF binaural audio reproduction with high directional accuracy for creating an improved listening experience with high engagement, immersion, and/or naturalness, even in listener positions outside the area spanned by the microphone arrays.

This may be achieved in some embodiments by determining the positions of the most prominent sound sources (e.g., receiving the positions or estimating them using the microphone-array signals), determining the contribution of the direct sound from the corresponding sources at microphone-array positions, determining "residual" spatial information at the microphone-array positions (describing the spatial sound without the determined direct-sound contribution), determining "direct-sound" spatial information related to the determined direct sound at the listener position, determining "residual" spatial information at the listener position, determining a selection or mixture of the array signals (based on the listener and array positions), and rendering a spatial output based on the determined "direct-sound" spatial information, "residual" spatial information, and the selection or mixture of the array signals.

In such embodiments the rendered spatial audio may have a high directional precision, even in the listener positions outside the area spanned by the microphone arrays, as the rendering uses information on the sound source positions.

Moreover, the embodiments may be implemented seamlessly with current approaches since where source positions are not known (or their contribution is estimated to be zero), the "residual" spatial information is the spatial information as used in the current approaches.

In particular, a benefit of some embodiments is that it cross-fades naturally between the proposed processing utilizing "direct-sound" spatial information and the current state of the art, depending on the source signal powers. This is a desirable property, since the state of the art approaches are robust to ambient sounds. On the other hand, when the most prominent sources dominate the scene, the proposed processing, utilizing "direct-sound" spatial information, will override the interpolation of parameters as defined in the prior art methods, producing stable rendering.

The aforementioned spatial information can, e.g., refer to spatial metadata (such as directions and direct-to-total energy ratios) or to physical properties (such as intensities and energies). The spatial information is typically estimated in frequency bands.

Figure 2:
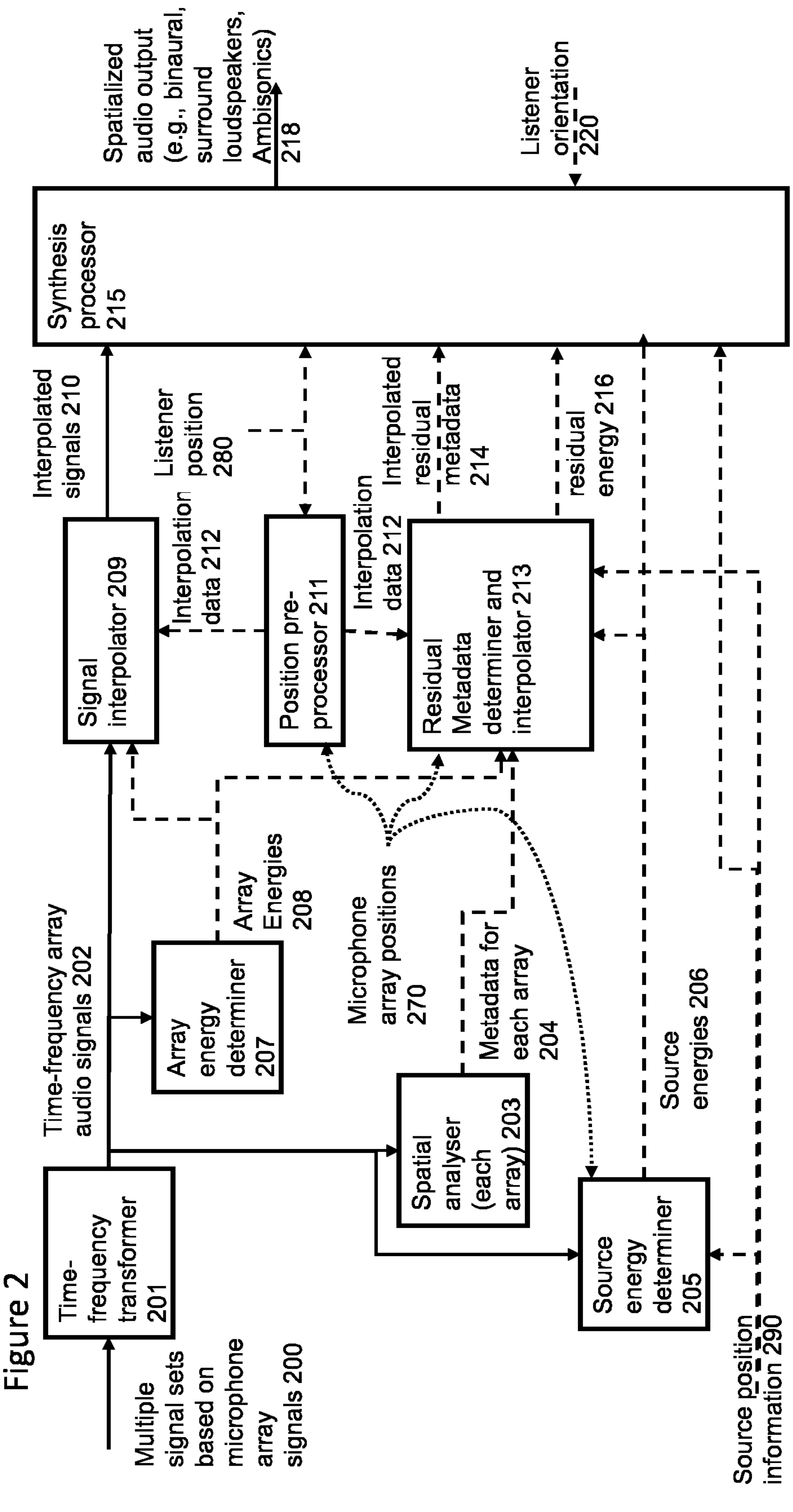
FIG. 2 shows an overview of some embodiments with respect to the capture and rendering of spatial metadata.

With respect to FIG. 2 an example system is shown. In some embodiments this system may be implemented on a single apparatus. However, in some other embodiments the functionality described herein may be implemented on more than one apparatus.

In some embodiments the system comprises an input configured to receive multiple signal sets based on microphone array signals 200. The multiple signal sets based on microphone array signals may comprise J sets of multichannel signals. The signals may be microphone array signals themselves, or the array signals in some converted form, such as Ambisonic signals. These signals are denoted as $s_j(m,i)$, where j is the index of the microphone array from which the signals originated (i.e., the signal set index), m is the time in samples, and i is the channel index of the signal set. In the example embodiment as described herein the multiple signal sets based on microphone array signals 200 are in Ambisonic form, for example in a 3rd order Ambix format having 16 audio channels. Such a signal is obtainable for example when the microphone arrays are Eigenmikes by mc acoustics LLC or similar. When the invention is used in conjunction with the Moving Picture Experts Group (MPEG) audio standards such as the MPEG-H 3D or the upcoming MPEG-I, the multiple signal sets based on microphone array signals 200 may be in the equivalent spatial domain (ESD) format, which can either be converted to Ambisonics as a preprocessing step or the processing according to the example embodiments can be done on the ESD format directly. The principles outlined with the example embodiments herein may be otherwise adopted for other signal formats without undue application of inventive thought by an engineer skilled in the art.

The multiple signal sets can be passed to a time-frequency transformer 201. The time-frequency transformer 201 may be configured to receive the multiple signal sets based on microphone array signals 200. The time-frequency transformer 201 is configured to convert the input signals $s_j(m,i)$ to time-frequency domain, e.g., using short-time Fourier transform (STFT) or complex-modulated quadrature mirror filter (QMF) bank. As an example, the STFT is a procedure that is typically configured so that for a frame length of N samples, the current and the previous frame are windowed and processed with a fast Fourier transform (FFT). The result is the time-frequency domain signals which are denoted as $S_j(b,n,i)$, where b is the frequency bin and n is the temporal frame index. The Time-frequency array signals 202 can then be output to a signal interpolator 209, an array energy determiner 207, a spatial analyser 203 and a source energy determiner 205.

The system can in some embodiments further comprise an array energy determiner 207. The array energy determiner 207 in some embodiments is configured to receive the time-frequency array signals 202. For the example where the time-frequency array signals 202 are in an Ambisonic form the energy of the arrays may be estimated from the zeroth (omnidirectional) Ambisonic component. In other words the energy of the arrays may be estimated from the signal as $S_j(b,n,1)$. The energy for each array may in some embodiments be estimated in frequency bands. While a frequency bin denotes a single complex sample in the STFT domain (or in another time-frequency transform domain), a frequency band denotes a group of these bins. Denoting k=1 . . . K as the frequency band index and K is the number of frequency bands, each band k has a lowest bin $b_{k,low}$ and a highest bin $b_{k,high}$. The frequency bands for energy estimation are the same as the frequency bands where the spatial metadata is determined. The energies for each array in some embodiments are estimated by $$E_{j,arr}(k,n)=\sum_{b_{k,low}}^{b_{k,high}}|S_j(b,n,1)|^2$$

Note that in this example embodiment the estimation of energy is determined over the frequency axis only. However, in some embodiments, depending on the applied filter bank, the energy estimation may include also averaging over the temporal axis, using IIR or FIR averaging. The option to perform temporal averaging may be applicable to other formulations of the array energies. The values $E_{j,arr}(k,n)$ are the array energies which can be output to the signal interpolator 209 and the residual metadata determiner and interpolator 213.

In some embodiments the system comprises a spatial analyser 203. The spatial analyser 203 is configured to receive the audio signals $S_j(b,n,i)$ and analyse these to determine spatial metadata for each array in time-frequency domain.

The spatial analysis can be based on any suitable technique and there are already known suitable methods for a variety of input types. For example, if the input signals are in an Ambisonic or Ambisonic-related form (e.g., they originate from B-format microphones), or the arrays are such that can be in a reasonable way converted to an Ambisonic form (e.g., Eigenmike), then Directional Audio Coding (DirAC) analysis can be performed. First order DirAC has been described in Pulkki, Ville. "Spatial sound reproduction with directional audio coding." Journal of the Audio Engineering Society 55, no. 6 (2007): 503-516, in which a method is specified to estimate from a B-format signal (a variant of a first-order Ambisonics) a set of spatial metadata consisting of direction and ambient-to-total energy ratio parameters in frequency bands.

When higher orders of Ambisonics are available, then Archontis Politis, Juha Vilkamo, and Ville Pulkki. "Sector-based parametric sound field reproduction in the spherical harmonic domain." IEEE Journal of Selected Topics in Signal Processing 9, no. 5 (2015): 852-866 provides methods for obtaining multiple simultaneous direction parameters. Further methods which may be implemented in some embodiments include estimating the spatial metadata from flat devices such as mobile phones and tablets as described in PCT published patent application WO2018/091776, and a similar delay-based analysis method for non-flat devices GB published patent application GB2572368.

In other words, there are various methods to obtain spatial metadata and a selected method may depend on the array type and/or audio signal format. In some embodiments, one method is applied at one frequency range, and another method at another frequency range. In the following examples the analysis is based on receiving first-order Ambisonic (FOA) audio signals (which is a widely known signal format in the field of spatial audio). Furthermore in these examples a modified DirAC methodology is used. For example the input is an Ambisonic audio signal in the known SN3D normalized (Schmidt semi-normalisation) and ACN (Ambisonics Channel Number) channel-ordered form.

In some embodiments the spatial analyser is configured to perform the following for each microphone array:

1) The first four channels of the time-frequency domain (Ambisonic) signals which are denoted as $S_j(b,n,i)$, where b is the frequency bin and n is the temporal frame index are grouped in a vector form by $$s_{j,FOA}(b,n)=\begin{bmatrix}S_j(b,n,1)\\S_j(b,n,2)\\S_j(b,n,3)\\S_j(b,n,4)\end{bmatrix}$$

2) Next, a signal covariance matrix of the FOA signal is estimated in frequency bands by $$C_{FOA,j}(k,n)=\begin{bmatrix}c_{1,1,j}(k,n)&c_{1,2,j}(k,n)&c_{1,3,j}(k,n)&c_{1,4,j}(k,n)\\c_{2,1,j}(k,n)&c_{2,2,j}(k,n)&c_{2,3,j}(k,n)&c_{2,4,j}(k,n)\\c_{3,1,j}(k,n)&c_{3,2,j}(k,n)&c_{3,3,j}(k,n)&c_{3,4,j}(k,n)\\c_{4,1,j}(k,n)&c_{4,2,j}(k,n)&c_{4,3,j}(k,n)&c_{4,4,j}(k,n)\end{bmatrix}=\sum_{b=b_{k,low}}^{b_{k,high}}s_{j,FOA}(b,n)s_{j,FOA}^H(b,n)$$

In some embodiments there may be applied temporal smoothing over time indices n.

3) Then, an inverse sound field intensity vector is determined that points to the opposing direction of the propagating sound $$i_j(k,n)=\mathrm{Re}\left\{\begin{bmatrix}c_{1,4,j}(k,n)\\c_{1,2,j}(k,n)\\c_{1,3,j}(k,n)\end{bmatrix}\right\}$$

Note the channel order, which converts the ACN order to the cartesian x, y, z order.

4) Then, the direction parameter for band k and time index n is determined as the direction of $i_j(k,n)$. The direction parameter may be expressed for example as azimuth $\theta_j(k,n)$ and elevation $\varphi_j(k,n)$.

5) The direct-to-total energy ratio is then formulated as $$r_j(k,n)=\frac{2|i_j(k,n)|}{\sum_{p=1}^{4}c_{p,p,j}(k,n)}$$

The azimuth $\theta_j(k,n)$, elevation $\varphi_j(k,n)$ and direct-to-total energy ratio $r_j(k,n)$ are formulated for each band k, for each time index n, and for each signal set (each array) j. This information thus forms the metadata for each array 204 that is output from the spatial analyser to the residual metadata determiner and interpolator 213.

The system in some embodiments comprises a source energy determiner 205. The source energy determiner is configured to receive time-frequency array signals 202, microphone array positions 270 and source position information 290.

The microphone array positions (for each array j) 270 may be defined as position column vectors $p_{j,arr}$ which may be 3×1 vectors containing the x,y,z cartesian coordinates in metres. In the following examples are shown only 2×1 column vectors containing the x,y coordinates, where the elevation (z-axis) of sources, microphones and the listener is assumed to be the same. Nevertheless, the methods described herein may be straightforwardly extended to include also the z-axis.

The source position information 290 in some embodiments may be an input determined by a recording engineer, or by an analysis of the sound scene based on the microphone array signals. The source position information 290 may for example be based on multi-target tracking of directional estimates, using for example particle filtering techniques, such as described within Särkkä, Simo, Aki Vehtari, and Jouko Lampinen. "*Rao-Blackwellized particle filter for multiple target tracking.*" *Information Fusion* 8.1 (2007): 2-15.

The source positions in some embodiments may be defined as position column vectors $p_{l,src}$ which contain the x,y,z cartesian coordinates, or, for simplicity of illustration, only the x,y coordinates. The distance between source l and array j can be defined as:

$$d_{lj} = \|p_{l,src} - p_{j,arr}\|$$

The position data may vary in time, even if it is not explicitly described in the formulas.

The determination of the energies of sources at the sound scene can in some embodiments be achieved with beamforming and post-filtering.

Figure 4:
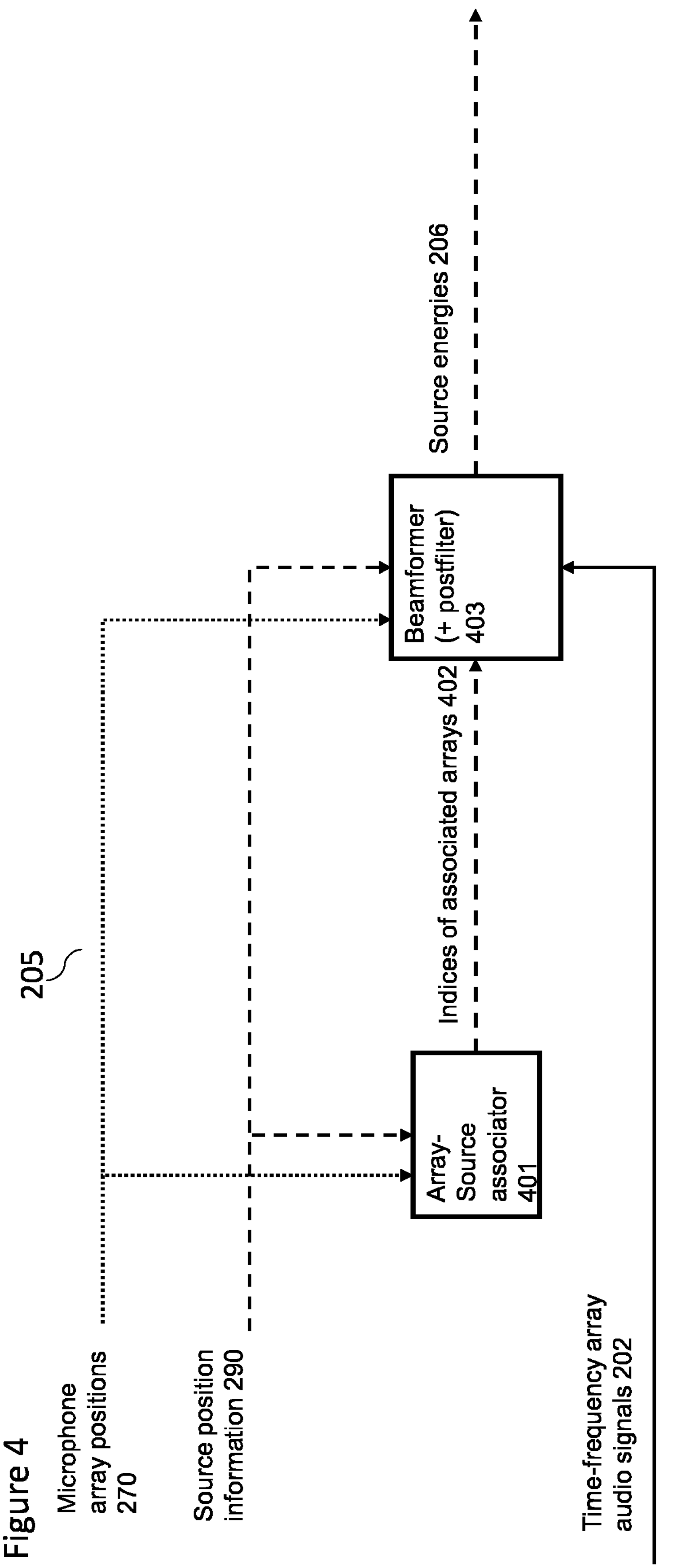
FIG. 4 shows an example of the source energy determiner shown in FIG. 2 according to some embodiments.

An example source energy determiner 205 is shown in further detail in FIG. 4. FIG. 4 shows for example an array-source associator 401 which is configured to receive the microphone array positions 270 and source position information 290. The array-source associator 401 is configured to determine array-source pairs, where each source is associated with an array. For source index l, l=1, . . . , $L_{src}$, where $L_{src}$ is the number of known sources, the paired microphone array index is denoted j. The pairing could be simply selecting the closest array to each source l by minimizing $d_{lj}$ over j. Alternatively, if there are many arrays available, the sources may also be paired each to a unique nearby array when possible, even if it means that the particular array is not the closest. The indices of associated arrays $j_l$ 402 can then be provided to a Beamformer (and post-filter) 403.

The beamformer (and post-filter) 403 is configured to receive the indices of associated arrays $j_l$ 402, the microphone array positions 270, the source position information 290 and the time-frequency array signals 202. Based on the microphone array positions 270 and source position information 290, the direction of each source l from the associated array $j_l$ is determined, and beamforming is performed for array $j_l$ to the direction of source l to determine the energy of the source l. For each source l, for the array $j_l$, beamforming weights $w_l(b,n)$ that focus the beam pattern towards the source l from the array $j_l$ are determined (the array index $j_l$ is omitted for brevity). The beamforming weight design may be static or adaptive. Since the present example is based on signals in an Ambisonic format, and more specifically using the known SN3D normalization scheme, an example static beamformer may be formulated based on Ambisonic encoding coefficients towards the focus direction by $w_l(b,n)=a/L$, where L is the Ambisonic order and a is a vector of Ambisonic encoding coefficients towards the focus direction. The focus direction for each source l is towards the direction-of-arrival unit vector $$\frac{p_{l,src} - p_{j_l,arr}}{\|p_{l,src} - p_{j_l,arr}\|}$$

Known adaptive beamforming methods include minimum variance distortionless response (MVDR) beamformer, where in our example the Ambisonic encoding coefficients may be used as the array steering vectors in the known MVDR formula. Various further beamforming methods are well known in the literature.

The beamform weights $w_l(b,n)$ are applied to the signal $S_{j_l}(b,n,i)$ of array $j_l$ to obtain beamformer output signal $\mathrm{beam}_l(b,n)$ by $$\mathrm{beam}_l(b,n)=g_l(b,n)w_l^H(b,n)s_{j_l}(b,n)$$

where $g_l(b,n)$ is an optional post-filter gain described further below, and $$s_{j_l}(b,n) = \begin{bmatrix} S_{j_l}(b,n,1) \\ S_{j_l}(b,n,2) \\ \vdots \\ S_{j_l}(b,n,I_{j_l}) \end{bmatrix}$$

where $I_{j_l}$ is the total number of audio channels at array $j_l$, for example 16 if we have $3^{rd}$ order Ambisonic signals.

The beamformer output may be further processed with a post filter. The post-filter may in some embodiments be a gain in frequency bins that improves the spectral accuracy of the beamformer output, so that the spectrum matches better the spectrum of the sound arriving from the direction of the source. One effective method for post-filtering is based on adaptive orthogonal beamformers, as described in Symeon Delikaris-Manias, Juha Vilkamo, and Ville Pulkki. "*Signal-dependent spatial filtering based on weighted-orthogonal beamformers in the spherical harmonic domain.*" *IEEE/ACM Transactions on Audio, Speech, and Language Processing* 24.9 (2016): 1511-1523. Another method is to monitor spatial metadata (directions, ratios) when available, and to attenuate the signal when the sound is known to arrive from another direction than that of the source, or when the sound is ambient. Regardless of the applied post-filter, the result of the post-filter algorithm is a gain $g_l(b,n)$ which is applied to obtain the beamformer output as in the equations above.

In some embodiments therefore a temporary source signal energies per frequency band may be formulated as $$E'_{l,src}(k,n) = \sum_{b=b_{k,low}}^{b_{k,high}} |\mathrm{beam}_l(b,n)|^2.$$

An alternative way to formulate the temporary energy is $$E'_{l,src}(k,n) = \sum_{b=b_{k,low}}^{b_{k,high}} g_l^2(b,n)w_l^H(b,n)s_j(b,n)s_j^H(b,n)w_l(b,n).$$

In the above, the temporary source energies were estimated with a beamformer and an optional post filter. In alternative embodiments, it is possible to adapt a post-filtering technique (i.e., without a separate beamformer) for the temporary source energy estimates, as some post-filters involve a step of actually estimating the sound energy at the look direction.

The temporary source signal energies are then normalized to 1-metre distances from the source position. First, based on the "Source position information" and the "Microphone array positions" the distance in meters $d_{lj_l}=\|p_{l,src}-p_{j_l,arr}\|$ between the source l and the array $j_l$ is formulated and then the energy is normalized to the 1-meter distance by $$E_{l,src}(k,n) = E'_{l,src}(k,n)d_{lj_l}^2$$

In some embodiments, the distance value is limited in maximum allowed value before the above formula is applied to avoid artefacts due to estimation errors when the source is far from the array. Note that although not explicitly written in the formulas, any of the position data and the dependent values such as the distance $d_{lj_l}$ may vary as a function of time (e.g., in the case of moving sources).

In some embodiments, the energy estimates can also be obtained by performing the beamforming (and/or post-filtering) with multiple arrays, and combining the result (e.g., taking the minimum energy value from the obtained estimates).

The source energies $E_{l,src}(k,n)$ 206 can then be output from the beamformer (and post filter) 403 (and are also the output of the source energy determiner 205).

Figure 5:
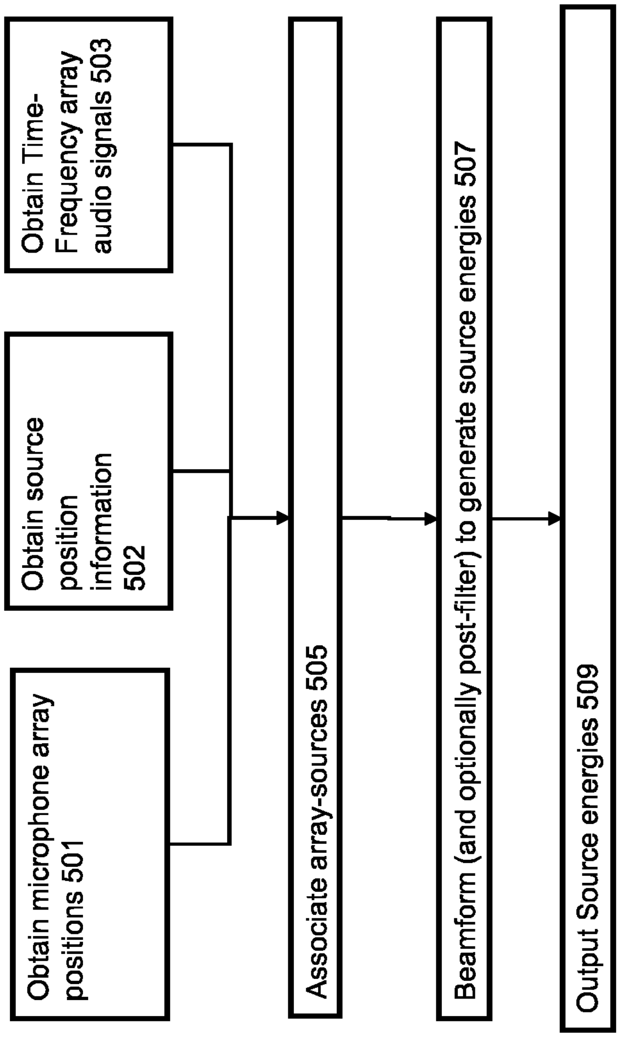
FIG. 5 shows a flow diagram of the operations of the example source energy determiner shown in FIG. 4 according to some embodiments.

With respect to FIG. 5 it is shown a flow diagram of the operations of the example source energy determiner 205.

The obtaining of the microphone array positions is shown in FIG. 5 by step 501.

The obtaining of the source position information is shown in FIG. 5 by step 502.

The obtaining of the time-frequency array audio signals is shown in FIG. by step 503.

Having obtained the microphone array positions, the source position information and the time-frequency array audio signals the array-source association is implemented as shown in FIG. 5 by step 505.

Having then associated the arrays to sources then the beamforming and optional post-filtering may be implemented to generate the source energies as shown in FIG. 5 by step 507.

The source energies may then be output as shown in FIG. 5 by step 509.

The above is an example of a method of determining source energies and in some embodiments other methods may be implemented for the same purpose.

For example a further method would be to:

- determine a set of beams (by beamforming) from the arrays to sources, so that each source is at the maximum focus direction of at least one beam;
- determine energies of these beams and collect them to a column vector b;
- determine a matrix G that consists of energy multiplier values which indicate how much the energy of each source contributes to the energy of each beam. For example, the entry at the first column and second row means the energy multiplier from the first source to the second beam;
- solve a vector e containing the source energies from the equation b=Ge by inversion $e=G^{-1}b$ where the matrix $G^{-1}$ indicates the inverse or pseudo-inverse, and it may be regularized.

In some embodiments the system, returning to FIG. 2, furthermore comprises a position pre-processor 211. The position pre-processor 211 is configured to receive information about the microphone array positions 270 and the listener position 280 within the audio environment.

As it is known in the prior art, the key aim in parametric spatial audio capture and rendering is to obtain a perceptually accurate spatial audio reproduction for the listener. Thus the position pre-processor 211 is configured to be able to determine for any position (as the listener may move to arbitrary positions), interpolation data to allow the interpolation and modification of metadata based on the microphone array positions 270 and the listener position 280.

In the example here the microphone arrays are located on a plane. In other words, the arrays have no z-axis displacement component. However extending the embodiments to the z-axis can be implemented in some embodiments, as well as to situations where the microphone arrays are located on a line (in other words there is only one axis displacement).

Figure 6:
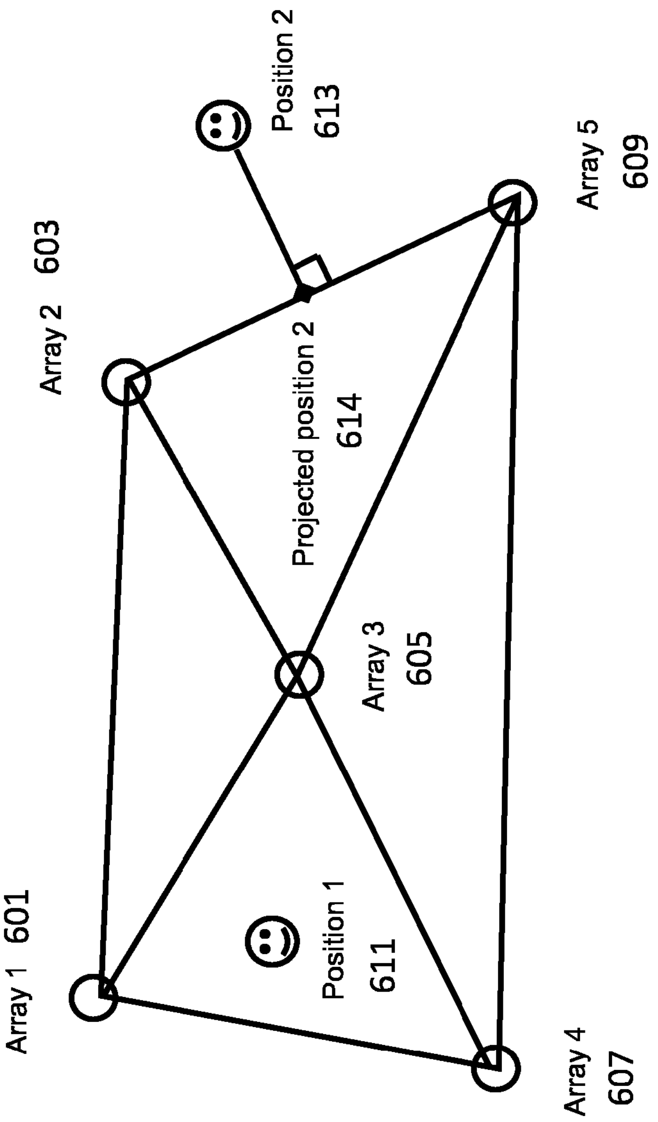
FIG. 6 shows schematically source positions within and outside of the array configuration.

For example FIG. 6 shows a microphone arrangement where the microphone arrays (shown as circles Array 1 601, Array 2 603, Array 3 605, Array 4 607 and Array 5 609) are positioned on a plane. The spatial metadata has been determined at the array positions. The arrangement has five microphone arrays on a plane. The plane may be divided into interpolation triangles, for example, by Delaunay triangulation. When a user moves to a position within a triangle (for example position 1 611, then the three microphone arrays that form a triangle containing the position are selected for interpolation (Array 1 601, Array 3 605 and Array 4 607 in this example situation). When the user moves outside of the area spanned by the microphone arrays (for example position 2 613), the user position is projected to the nearest position at the area spanned by the microphone arrays (for example projected position 2 614), and then an array-triangle is selected for interpolation where the projected position resides (in this example, these arrays are Array 2 603, Array 3 605, and Array 5 609).

In the above example, the projecting of the position thus maps the positions outside the area determined by the microphone arrangements to the edge of the area determined by the microphone arrangements. However, this affects only the residual part of the sound field, which typically contains mostly ambience and reverberation, for which this kind of minor position offset typically is not detrimental. The directionally more important direct sound sources in some embodiments are rendered according to the actual (non-projected) listener position as described herein.

The position pre-processor 211 can thus determine:

The listener position vector $p_{List}$ (a 2-by-1 vector in this example containing the x and y coordinates) which may be the original position or, when projection occurs, the projected position;

Three microphone arrangement indices $j_{List,1}$, $j_{List,2}$, $j_{List,3}$ and corresponding position vectors $p_{jList_x}$. These three microphone arrangements are those encapsulating (potentially projected) position $p_{List}$.

The position pre-processor 211 can furthermore further formulate interpolation weights $w_1$, $w_2$, $w_3$. These weights can be formulated for example using the following known conversion between barycentric and Cartesian coordinates. First a 3×3 matrix is determined based on position vectors $p_{jList_x}$ by appending each vector with a unity value and combining the resulting vectors to a matrix $$P_{j_{List1},j_{List2},j_{List3}} = \begin{bmatrix} p_{jList,1} & p_{jList,2} & p_{jList,3} \\ 1 & 1 & 1 \end{bmatrix}$$

Then, the weights are formulated using a matrix inverse and a 3×1 vector that is obtained by appending the listener position vector $p_L$ with unity value $$\begin{bmatrix} w_1 \\ w_2 \\ w_3 \end{bmatrix} = P^{-1}_{j_{List,1},j_{List,2},j_{List,3}} \begin{bmatrix} p_{List} \\ 1 \end{bmatrix}$$

The interpolation weights ($w_1$, $w_2$, and $w_3$), position vectors ($p_{List}$, $p_{jList,1}$, $p_{jList,2}$, and $p_{jList,3}$), and the microphone arrangement indices ($j_{List,1}$, $j_{List,2}$, and $j_{List,3}$) together form the interpolation data 212 which are provided to the signal interpolator 209 and the residual metadata determiner and interpolator 213.

In some embodiments the system comprises a residual metadata determiner and interpolator 213 configured to receive the interpolation data 212, the microphone array positions 270, the array energies 208, the source energies 206, and also metadata for each array 204. The residual metadata determiner and interpolator 213 is configured to subtract (or otherwise attenuate/suppress) from the metadata for each array 204 the contribution of the known sources (determined by the source energies 206 and source position information 290). This allows the obtaining of the spatial metadata without the effect (or with attenuated/suppressed effect) of these known sources. This in turn allows the rendering of the known sources and the residual (remainder) sounds separately.

In some embodiments the residual metadata determiner and interpolator 213 is configured to map or interpolate the residual metadata at the array positions to the listener position (or, the projected position in case the position was projected).

Figure 7:
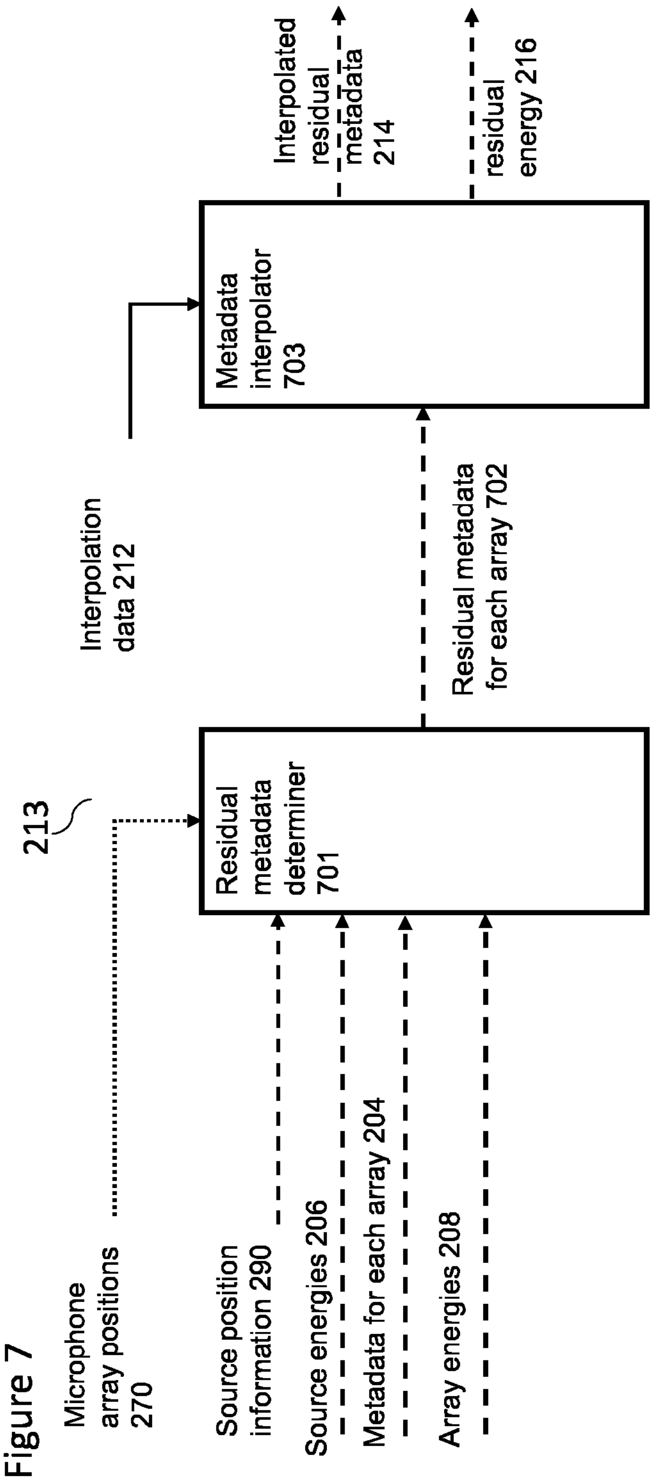
FIG. 7 shows an example of the residual metadata determiner and interpolator shown in FIG. 2 according to some embodiments.

A schematic view of an example residual metadata determiner and interpolator 213 is shown in FIG. 7. The operations implemented by the example residual metadata determiner and interpolator 213 are shown in the flow diagram of FIG. 8.

The residual metadata determiner and interpolator 213 in some embodiments comprises a residual metadata determiner 701. The residual metadata determiner 701 is configured to determine the residual metadata for each microphone array. In some embodiments this is performed only to the arrays that are used for the metadata interpolation. The input to the residual metadata determiner 701 is the metadata for each array (azimuth $\theta_j(k,n)$, elevation $\varphi_j(k,n)$ and direct-to-total energy ratio $r_j(k,n)$), the energy for each array $E_{j,arr}(k, n)$, the array positions $p_{j,arr}$, the source energies $E_{l,src}(k,n)$, and the source positions $p_{l,src}$.

Using the metadata and the array energies, the intensity vector is estimated for each array $$i_j(k,n) = \begin{bmatrix} \cos(\theta_j(k,n))\cos(\varphi_j(k,n)) \\ \sin(\theta_j(k,n))\cos(\varphi_j(k,n)) \\ \sin(\varphi_j(k,n)) \end{bmatrix} r_j(k,n) E_{j,arr}(k,n)$$

Then, the intensity and the energy of the direct sources is estimated for each array j:

$$i_{j,dir}(k,n) = \sum_{l=1}^{L} \frac{1}{d_{lj}^2} E_{l,src}(k,n)\gamma_{jl}$$

$$E_{j,dir}(k,n) = \sum_{l=1}^{L} \frac{1}{d_{lj}^2} E_{l,src}(k,n)$$

where the $\gamma_{jl}$ is the direction-of-arrival of source l to microphone j (as a unit vector):

$$\gamma_{jl} = \frac{p_{l,src} - p_{j,arr}}{d_{lj}}$$

where $d_{lj}$ is the distance from source l to microphone j. Using the determined source and array intensities and energies, the residual intensities and energies are determined for each array $$i_{j,res}(k,n) = i_j(k,n) - i_{j,dir}(k,n)$$

$$E_{j,res}(k,n) = \max\,[eps, (E_j(k,n) - E_{j,dir}(k,n))]$$

where eps is a small value to avoid divide-by-zero for later operations.

Using the determined residual intensities and energies, and denoting $$i_{j,res}(k,n) = [\, i_1(k,n) \;\; i_2(k,n) \;\; i_3(k,n)\,]^T,$$

the residual metadata can be determined:

$$\theta_{j,res}(k,n) = \mathrm{atan2}(i_2(k,n), i_1(k,n))$$

$$\text{or } \theta_{j,res}(k,n) = 0 \text{ if } i_1(k,n) = i_2(k,n) = 0, \text{ and}$$

$$\varphi_{j,res}(k,n) = \mathrm{atan2}\left(i_3(k,n), \sqrt{i_1^2(k,n) + i_2^2(k,n)}\right)$$

$$\text{or } \varphi_{j,res}(k,n) = 0 \text{ if } i_1(k,n) = i_2(k,n) = i_3(k,n) = 0, \text{ and}$$

$$r_{j,res}(k,n) = \min\left[1, \frac{\sqrt{i_1^2(k,n) + i_2^2(k,n) + i_3^2(k,n)}}{E_{j,res}(k,n)}\right]$$

The residual metadata for each array 702 can then be output to a metadata interpolator 703.

The metadata interpolator 703 is configured to interpolate residual metadata using the interpolation weights $w_1$, $w_2$, $w_3$ contained within the interpolation data 212.

First, the residual spatial metadata is converted to a vector form $$v_j(k,n) = \begin{bmatrix} \cos(\theta_{j,res}(k,n))\cos(\varphi_{j,res}(k,n)) \\ \sin(\theta_{j,res}(k,n))\cos(\varphi_{j,res}(k,n)) \\ \sin(\varphi_{j,res}(k,n)) \end{bmatrix} r_{j,res}(k,n)$$

Then, these vectors are averaged by $$v(k,n) = w_1 v_{j_{list,1}}(k,n) + w_2 v_{j_{list,2}}(k,n) + w_3 v_{j_{list,3}}(k,n)$$

Then, denoting $$v(k,n) = [\, v_1(k,n) \;\; v_2(k,n) \;\; v_3(k,n)\,]^T,$$

the interpolated residual metadata 214 is obtained by $$\theta'(k,n) = \mathrm{atan2}(v_2(k,n), v_1(k,n))$$

$$\varphi'(k,n) = \mathrm{atan2}\left(v_3(k,n), \sqrt{v_1^2(k,n) + v_2^2(k,n)}\right)$$

$$r'(k,n) = \sqrt{v_1^2(k,n) + v_2^2(k,n) + v_3^2(k,n)}$$

The metadata interpolator 703 can furthermore be configured to formulate a residual energy 216 by $$E_{res}(k,n)=w_1E_{j_{list,1},res}(k,n)+w_2E_{j_{list,2},res}(k,n)+w_3E_{j_{list,3},res}(k,n)$$

The interpolated residual metadata 214 and the residual energy 216 are then output and also form the output of the residual metadata determiner and interpolator 213.

Thus in summary the residual metadata determiner and interpolator 213 operations are: The obtaining of the metadata for each array is shown in FIG. 8 by step 801.

Figure 8:
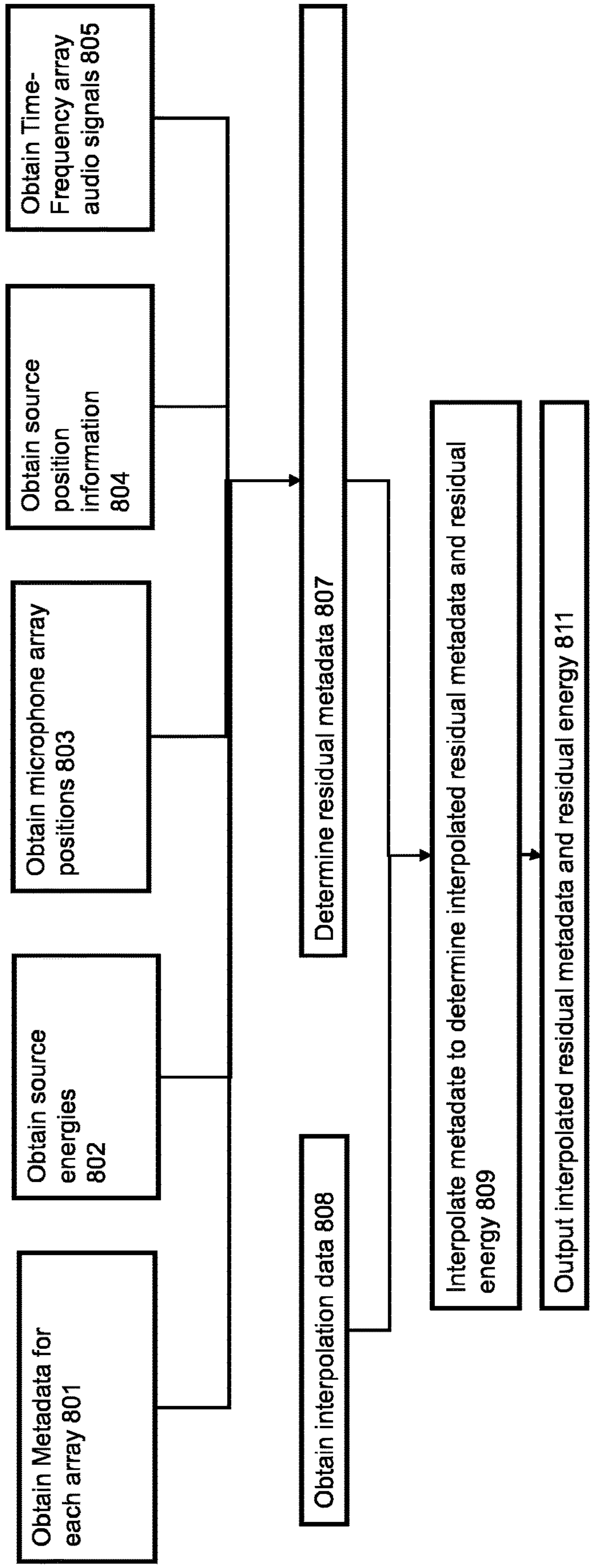
FIG. 8 shows a flow diagram of the operations of the example residual metadata determiner and interpolator shown in FIG. 7 according to some embodiments.

The obtaining of the source energies is shown in FIG. 8 by step 802.

The obtaining of the microphone array positions is shown in FIG. 8 by step 803.

The obtaining of the source position information is shown in FIG. 8 by step 804.

The obtaining of the time-frequency array audio signals is shown in FIG. 8 by step 805.

Having obtained the metadata, source energies, microphone array positions, the source position information and the time-frequency array audio signals the residual metadata is determined as shown in FIG. 8 by step 807.

The obtaining of the interpolation data is shown in FIG. 8 by step 808.

Having then determined the residual metadata and obtained the interpolation data then the metadata is interpolated to determine the interpolated residual metadata and residual energy as shown in FIG. 8 by step 809.

The interpolated residual metadata and residual energy may then be output as shown in FIG. 8 by step 811.

In some embodiments the system further comprises a signal interpolator 209. The signal interpolator 209 is configured to receive the time-frequency array audio signals 202, array energies 208 and the interpolation data 212.

The signal interpolator 209 may then be configured to determine for indices $j_{List,1}$, $j_{List,2}$, $j_{List,3}$ the distance values $d_{jList,x}=|p_{List}-p_{jList,x}|$, and the index with the smallest distance denoted as $j_{minD}$.

Then, the signal interpolator 209 is configured to determine the selected index $j_{sel}$. For the first frame (or, when the processing begins), the signal interpolator may set $j_{sel}=j_{minD}$.

For the next or succeeding frames (or any desired temporal resolution), when the user position has potentially changed, the signal interpolator is configured to resolve whether the selection $j_{sel}$ needs to be changed. The changing is needed if $j_{sel}$ is not contained by $j_{List,1}$, $j_{List,2}$, $j_{List,3}$. This condition means that the user has moved to another region which does not contain $j_{sel}$. The changing is also needed if $d_{j_{sel}}>d_{j_{minD}}\alpha$, where $\alpha$ is a threshold value. For example, $\alpha=1.2$. This condition means that the user has moved significantly closer to the array position of $j_{minD}$ when compared to array position of $j_{sel}$. The threshold is needed so that the selection does not erratically change back and forth when the user is in the middle of the two positions (in other words to provide a hysteresis threshold to prevent rapid switching between arrays).

If either of the above conditions is met, then $j_{sel}=j_{minD}$. Otherwise, the previous value of $j_{sel}$ is kept.

The intermediate interpolated signal is determined as $$S'_{interp}(b,n,i)=S_{j_{sel}}(b,n,i)$$

With such processing, when $j_{sel}$ changes, it follows that the selection is changed for all frequency bands at the same time. In some embodiments, the selection is set to change in a frequency-dependent manner. For example, when $j_{sel}$ changes, then some of the frequency bands are updated immediately, whereas some other bands are changed at the next frames until all bands are changed. Changing the signal in such a frequency-dependent manner may be needed to reduce potential switching artefacts at signal $S'_{interp}(b,n,i)$. In such a configuration, when the switching is taking place, it is possible that for a short transition period, some frequencies of signal $S'_{interp}(b,n,i)$ are from one microphone array, while the other frequencies are from another microphone array.

Then, the intermediate interpolated signal $S'_{interp}(b,n,i)$ is energy corrected. An equalization gain is formulated in frequency bands $$\rho(k,n)=\min\left(\rho_{max},\sqrt{\frac{E_{j_{list,1}}(k,n)w_1+E_{j_{list,2}}(k,n)w_2+E_{j_{list,3}}(k,n)w_3}{E_{j_{sel}}(k,n)}}\right)$$

The $\rho_{max}$ value limits excessive amplification, for example, $\rho_{max}=4$. Then the equalization is performed by multiplication $$S_{interp}(b,n,i)=\rho(k,n)S'_{interp}(b,n,i)$$

where k is the band index where bin b resides. The signal S(b,n,i) is then the interpolated signals 210 that is output to the synthesis processor.

In other words the signal interpolator is configured to generate at least one audio signal from at least one of the two or more audio signal sets from the arrays based on the positions associated with the at least two of the two or more audio signal sets and the listener position. In some embodiments this generation can be a selection of audio signals from the audio signal sets (in other words the generated audio signal is an indication of which audio signal which is passed to the synthesis processor.

The system furthermore comprises a synthesis processor 215. The synthesis processor 215 may be configured to receive listener orientation information 220 (for example head orientation tracking information) as well as the interpolated signals 210, listener position information 280, interpolated residual metadata 214, residual energy 216, source energies 206, source position information 290.

In some embodiments the synthesis processor is configured to determine a vector rotation function to be used in the following formulation. According to the principles in Laitinen, M. V., 2008. Binaural reproduction for directional audio coding. Master's thesis, Helsinki University of Technology, pages 54-55, it is possible to define a rotate function as $$\begin{bmatrix}x'\\y'\\z'\end{bmatrix}=\text{rotate}\left(\begin{bmatrix}x\\y\\z\end{bmatrix},\text{yaw, pitch, roll}\right)$$

where yaw, pitch and roll are the head orientation parameters and x,y,z are the values of a unit vector that is being rotated. The result is x',y',z', which is the rotated unit vector. The mapping function performs the following steps:

1. Yaw Rotation $$x_1 = \cos(\text{yaw})x + \sin(\text{yaw})y$$
$$y_1 = -\sin(\text{yaw})x + \cos(\text{yaw})y$$
$$z_1 = z$$

2. Pitch Rotation $$x_2 = \cos(-\text{pitch} + a\tan2(z_1, x_1))\sqrt{1 - y_1^2}$$
$$y_2 = y_1$$
$$z_2 = \cos\left(-\frac{\pi}{2} - \text{pitch} + a\tan2(z_1, x_1)\right)\sqrt{1 - y_1^2}$$

3. And Finally, Roll Rotation $$x' = x_2$$
$$y' = \cos(\text{roll} + a\tan2(z_2, y_2))\sqrt{1 - x_2^2}$$
$$z' = \cos\left(-\frac{\pi}{2} + \text{roll} + a\tan2(z_2, y_2)\right)\sqrt{1 - x_2^2}$$

The synthesis processor 215 may implement, having determined these parameters a suitable spatial rendering. An example of a suitable spatial rendering is shown in further detail in FIG. 9.

The synthesis processor 215 in some embodiments comprises a prototype signal generator 901. The prototype signal generator 901 in some embodiments is configured to receive the interpolated (time-frequency) signals 210, along with the head (user/listener) orientation information 220.

A prototype signal is a signal that at least partially resembles the processed output and thus serves as a good starting point to perform the parametric rendering.

In the present example, the output is a binaural signal, and as such, the prototype signal is designed such that it has two channels (left and right) and it is oriented in the spatial audio scene according to the user's head orientation. The two-channel (for i=1,2) prototype signals may be formulated, for example, by $$S_{proto}(b, n, i) = \sum_{\hat{i}=1}^{4} p_{i,\hat{i}} S_{interp}(b, n, \hat{i})$$

where $p_{i,\hat{i}}$ are the mixing weights according to the head orientation information. For example, the prototype signal can be two cardioid pattern signals generated from the interpolated FOA components of the Ambisonic signals, one pointing towards the left direction (with respect to user's head orientation), and one towards the right direction. Such patterns are obtained when $p_{1,1}=p_{2,1}=0.5$ and (assuming the WYZX channel order)

$$p_{1,2} = 0.5[\cos(\text{yaw})\cos(\text{roll}) + \sin(\text{yaw})\sin(\text{pitch})\sin(\text{roll})]$$
$$p_{1,3} = -0.5\cos(\text{pitch})\sin(\text{roll})$$

-continued $$p_{1,4} = 0.5[\cos(\text{yaw})\sin(\text{pitch})\sin(\text{roll}) - \sin(\text{yaw})\cos(\text{roll})]$$

and $$\begin{bmatrix} p_{2,2} \\ p_{2,3} \\ p_{2,4} \end{bmatrix} = -\begin{bmatrix} p_{1,2} \\ p_{1,3} \\ p_{1,4} \end{bmatrix}.$$

The above example of cardioid-shaped prototype signals is only one example. In other examples, the prototype signal could be different for different frequencies, for example, at lower frequencies the spatial pattern may be less directional than a cardioid, while at the higher frequencies the shape could be cardioid. Such a choice is motivated since it is more similar to a binaural signal than a wide-band cardioid pattern is. However, it is not very critical which pattern design is applied, as long as the general tendency is to obtain some left-right differentiation for the prototype signals. This is since the parametric processing steps described in the following will correct the inter-channel features regardless.

The prototype signals 902 may then be expressed in a vector form $$x(b, n) = \begin{bmatrix} S_{proto}(b, n, 1) \\ S_{proto}(b, n, 2) \end{bmatrix}$$

The prototype signals can then be output to a covariance matrix estimator 903 and to a mixer 909. In some embodiments the generation of prototype signal may be configured to be energy-preserving so that, in frequency bands, the prototype signal has the same energy as the omnidirectional component of the input time frequency signal, i.e., the same overall energy (per frequency band) as $S_{interp}(b, n, 1)$.

In some embodiments the synthesis processor 215 comprises a covariance matrix estimator 903 configured to estimate a covariance matrix 908 of the time-frequency prototype signal, in frequency bands. As earlier, the covariance matrix 908 can be estimated as $$C_x(k, n) = \sum_{b=b_{k,low}}^{b_{k,high}} x(b, n)x^H(b, n).$$

The estimation of the covariance matrix may involve temporal averaging, such as infinite impulse response (IIR) averaging or finite impulse response (FIR) averaging over several time indices n.

The estimated covariance matrix 908 may be output to the mixing rule determiner 907.

The synthesis processor 215 may further comprise a target covariance matrix determiner 905. The target covariance matrix determiner 905 is configured to receive the interpolated residual spatial metadata 214, the residual energy estimate 216, the head position 280, the source position information 290 and source energies 206.

In this example, the interpolated residual spatial metadata 214 includes azimuth θ'(k,n), elevation φ'(k,n) and a direct-to-total energy ratio r'(k,n). The target covariance matrix determiner 905 in some embodiments also receives the head orientation (yaw, pitch, roll) information 220.

In some embodiments the target covariance matrix determiner is configured to rotate the spatial metadata according to the head orientation by $$\begin{bmatrix} v_1'(k,n) \\ v_2'(k,n) \\ v_3'(k,n) \end{bmatrix} = \text{rotate}\left(\begin{bmatrix} \cos(\theta'(k,n))\cos(\varphi'(k,n)) \\ \sin(\theta'(k,n))\cos(\varphi'(k,n)) \\ \sin(\varphi'(k,n)) \end{bmatrix}, \text{yaw, pitch, roll}\right)$$

The rotated directions are then $$\theta''(k,n) = a\tan 2\,(v_2'(k,n), v_1'(k,n))$$

$$\varphi''(k,n) = a\tan 2\left(v_3'(k,n), \sqrt{v_1'(k,n)v_1'(k,n) + v_2'(k,n)v_2'(k,n)}\right)$$

The target covariance matrix determiner 905 may also utilize a HRTF (head-related transfer function) data set that pre-exists at the synthesis processor. It is assumed that from the HRTF set it is possible to obtain a 2×1 complex-valued head-related transfer function (HRTF) h(θ,φ,k) for any angle θ, φ and frequency band k. For example, the HRTF data may be a dense set of HRTFs that has been pre-transformed to the frequency domain so that HRTFs may be obtained at the middle frequencies of the bands k. Then, at the rendering time, the nearest HRTF pairs to the desired directions may be selected. In some embodiments, interpolation between two or more nearest data points may performed. Various means to interpolate HRTFs have been described in the literature.

At the HRTF data set also a diffuse-field covariance matrix has been formulated for each band k. For example, the diffuse-field covariance matrix may be obtained by taking an equally distributed set of directions $\theta_d$, $\varphi_d$ where d=1 . . . D, and by estimating the diffuse-field covariance matrix as $$C_D(k) = \frac{1}{D}\sum_{d=1}^{D} h(\theta_d, \varphi_d, k)\, h^H(\theta_d, \varphi_d, k).$$

The target covariance matrix determiner 805 may then formulate the target covariance matrix by $$C_y(k,n) = C_{res}(k,n) + C_{dir}(k,n)$$

where $$C_{res}(k,n) = E_{res}(k,n)\big[r(k,n)\, h(\theta''(k,n), \varphi''(k,n), k)\, h^H(\theta''(k,n), \varphi''(k,n), k) + (1 - r(k,n))\, C_D(k)\big]$$

and $$C_{dir}(k,n) = \sum_{l=1}^{L} \frac{1}{d_{l,List}^2} E_{l,src}(k,n)\, h(\theta_l(n), \varphi_l(n), k)\, h^H(\theta_l(n), \varphi_l(n), k)$$

where $d_{l,list}$ is the distance from the l:th source to the listener position and $\theta_l$(n), $\varphi_l$(n) are the head-tracked azimuth and elevation angles of the l:th source to the listener position. The head tracking may be performed with the same rotation method as described previously for the spatial metadata.

In some embodiments the multipliers $$\frac{1}{d_{l,List}^2}$$

are limited to a maximum value, e.g., to 4, to avoid excessive sound levels when the listener moves close to a source position.

The target covariance matrix $C_y$(k,n) is then output to the mixing rule determiner 907.

In some embodiments the synthesis processor 215 further comprises a mixing rule determiner 907. The mixing rule determiner 907 is configured to receive the target covariance matrix $C_y$(k,n), and the measured covariance matrix $C_x$(k,n), and generates a mixing matrix M(k,n). The mixing procedure may use the method described in Vilkamo, J., Backström, T. and Kuntz, A., 2013. Optimized covariance domain framework for time-frequency processing of spatial audio. Journal of the Audio Engineering Society, 61(6), pp. 403-411 to generate a mixing matrix.

The formula provided in the appendix of the above reference can be used to formulate a mixing matrix M(k,n). In the present invention report, we used for clarity the same notation for matrices. In some embodiments the mixing rule determiner 907 is also configured to determine a prototype matrix $$Q = \begin{bmatrix} 1 & 0 \\ 0 & 1 \end{bmatrix}$$

that guides the generation of the mixing matrix 912. The rationale of these matrices and the formula to obtain a mixing matrix M(k,n) based on them is described in detail in the above cited reference and is not repeated herein. In short, the method is such that provides a mixing matrix M(k,n) that when applied to a signal with a covariance matrix $C_x$(k,n) produces a signal with covariance matrix substantially the same as or similar to $C_y$(k,n), in a least-squares optimized way. In these embodiments the prototype matrix Q is the identity matrix, since the generation of prototype signals has been already implemented by the prototype signal generator 901. Having an identity prototype matrix means that the processing aims to produce an output that is as similar as possible to the input (i.e., with respect to the prototype signals) while obtaining the target covariance matrix $C_y$(k,n). An example rendering scheme can be found from (Politis et al., 2017) Politis, A., McCormack, L. and Pulkki, V., 2017. *Enhancement of ambisonic binaural reproduction using directional audio coding with optimal adaptive mixing. In* 2017 *IEEE Workshop on Applications of Signal Processing to Audio and Acoustics* (*WASPAA*) (pp. 379-383). The mixing matrix M(k,n) 912 is formulated for each frequency band k and is provided to the mixer.

The synthesis processor 215 in some embodiments comprises a mixer 909. The mixer 909 is configured to receive the time-frequency prototype audio signals 902 and the mixing matrices 912. The mixer 909 processes the input prototype signal 902 to generate two processed (binaural) time-frequency signals 914.

$$y(b,n) = \begin{bmatrix} y_1(b,n \\ y_2(b,n \end{bmatrix} = M(k,n) \times (b,n)$$

where bin b resides in band k.

The above procedure assumes that the input signals x(b,n) had suitable incoherence between them to render an output signal y(b,n) with the desired target covariance matrix properties. It is possible in some situations that the input signal does not have suitable inter-channel incoherence. In these situations, there is a need to utilize decorrelating operations to generate decorrelated signals based on x(b,n), and to mix the decorrelated signals into a particular residual signal that is added to the signal y(b,n) in the above equation. The procedure of obtaining such a residual signal has been explained in the earlier cited reference. Note that the residual signal of the earlier citation is a different concept than the residual parts of the sound scene as discussed herein. There, the residual signal refers to a decorrelated part of the sound at the rendering stage. Here, the residual energies, residual metadata refer to the sound scene properties.

The mixer 909 is then configured to output the processed binaural time-frequency signal y(b,n) 914 is provided to an inverse T/F transformer 911.

The synthesis processor 215 in some embodiments comprises an inverse T/F transformer 911 which applies an inverse time-frequency transform corresponding to the applied time-frequency transform, such as an inverse STFT in case the signals are in the STFT domain to the processed binaural time-frequency signal 914 to generate a spatialized audio output 218, which may be in a binaural form that may be reproduced over the headphones.

Figure 9:
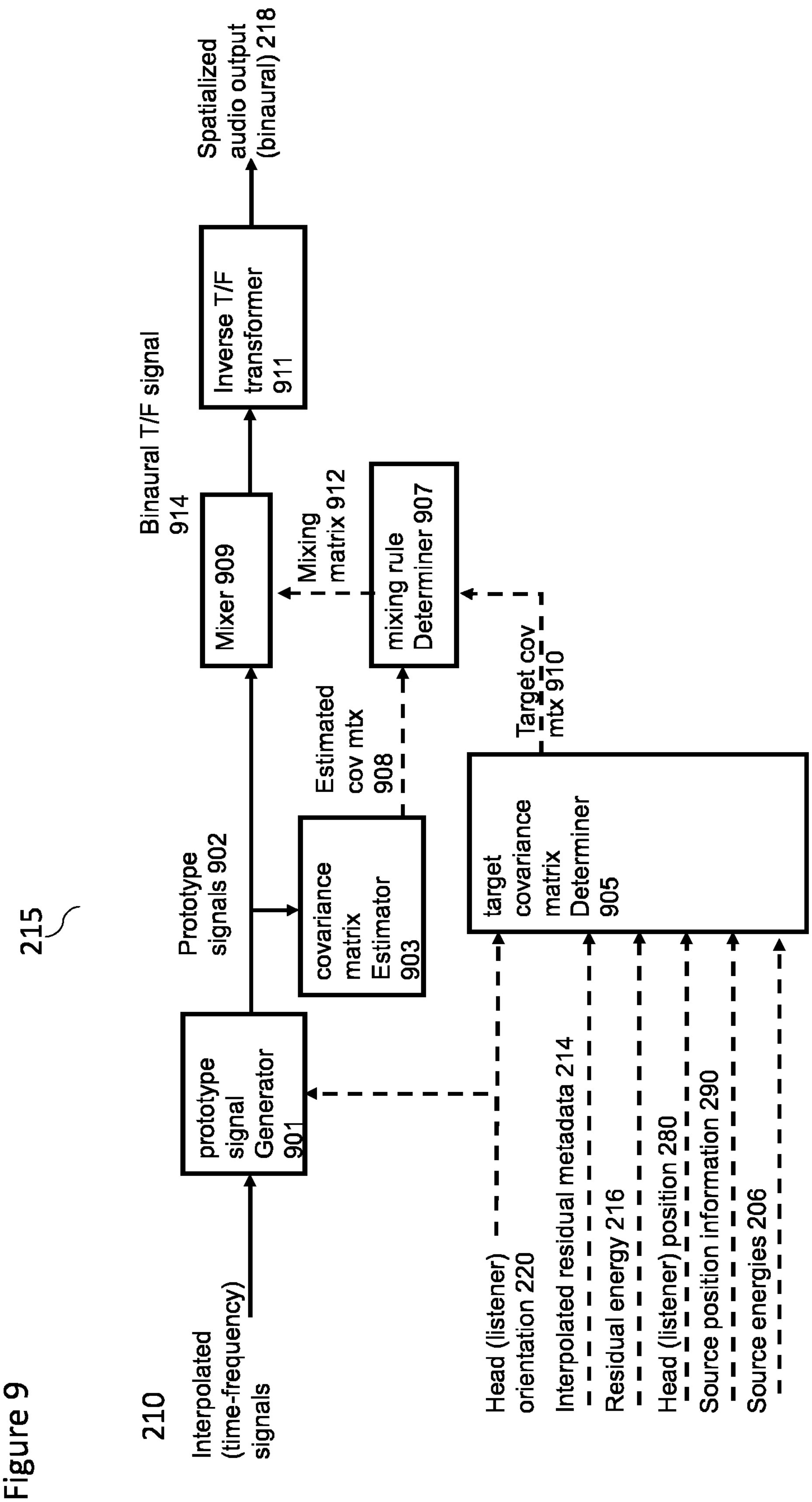
FIG. 9 shows an example of the synthesis processor shown in FIG. 2 according to some embodiments.
Figure 10:
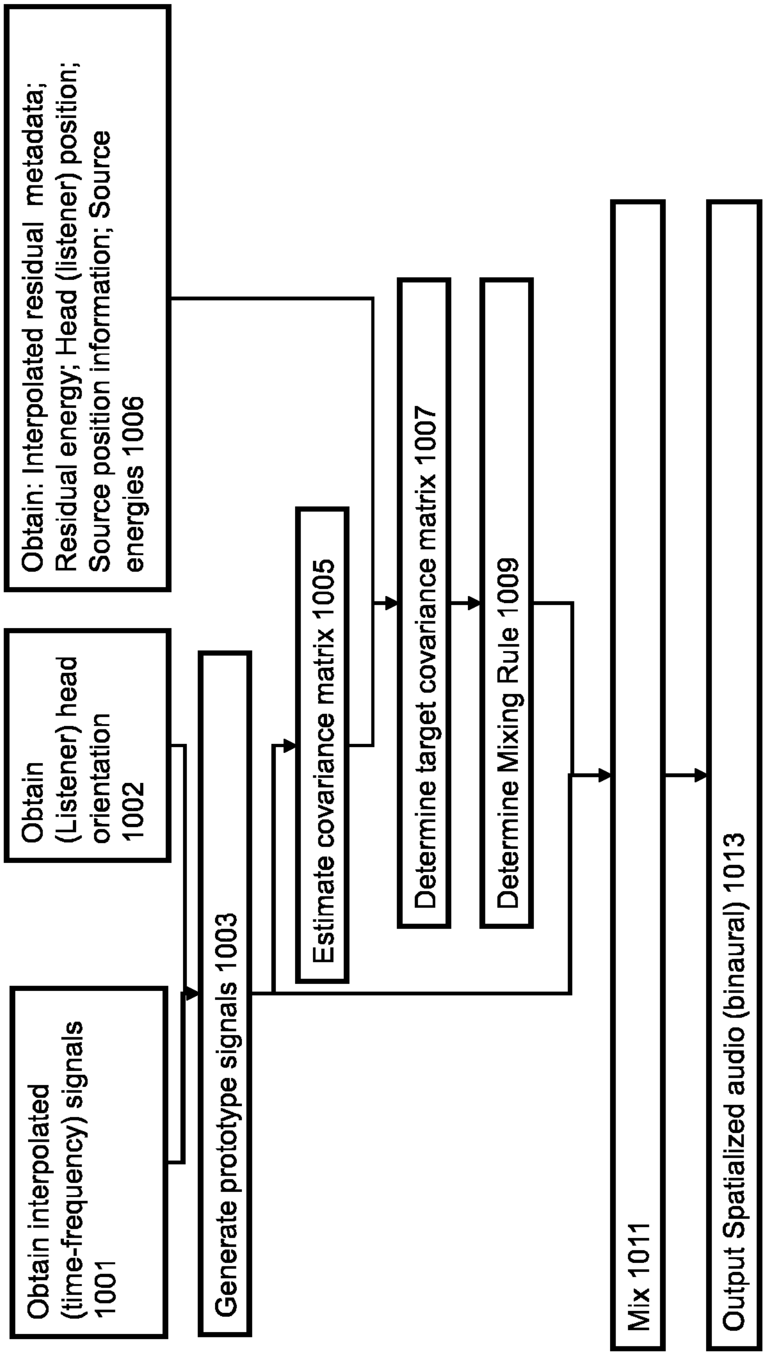
FIG. 10 shows a flow diagram of the operations of the synthesis processor shown in FIG. 9 according to some embodiments.

The operations of the synthesis processor shown in FIG. 9 are shown with respect to the flow diagram of FIG. 10.

Thus the method comprises obtaining interpolated (time-frequency) signals as shown in FIG. 10 by step 1001.

Furthermore are obtained listener head orientation as shown in FIG. 10 by step 1002.

Then based on the interpolated (time-frequency) signals and head orientation prototype signals are generated as shown in FIG. 10 by step 1003.

Additionally the covariance matrix is generated based on the prototype signal as shown in FIG. 10 by step 1005

Furthermore there may be obtained interpolated residual metadata, residual energy, head (listener) position, source position information, and source energies as shown in FIG. 10 by step 1006.

Based on the interpolated residual metadata, residual energy, head (listener) position and orientation, source position information, and source energies the target covariance matrix is determined as shown in FIG. 10 by step 1007.

A mixing rule can then be determined as shown in FIG. 10 by step 1009.

Based on the mixing rule and the prototype signals a mix can be generated as shown in FIG. 10 by step 1011 to generate the spatialized audio signals.

Then the spatialized audio signals may be output as shown in FIG. 10 by step 1013.

Figure 3:
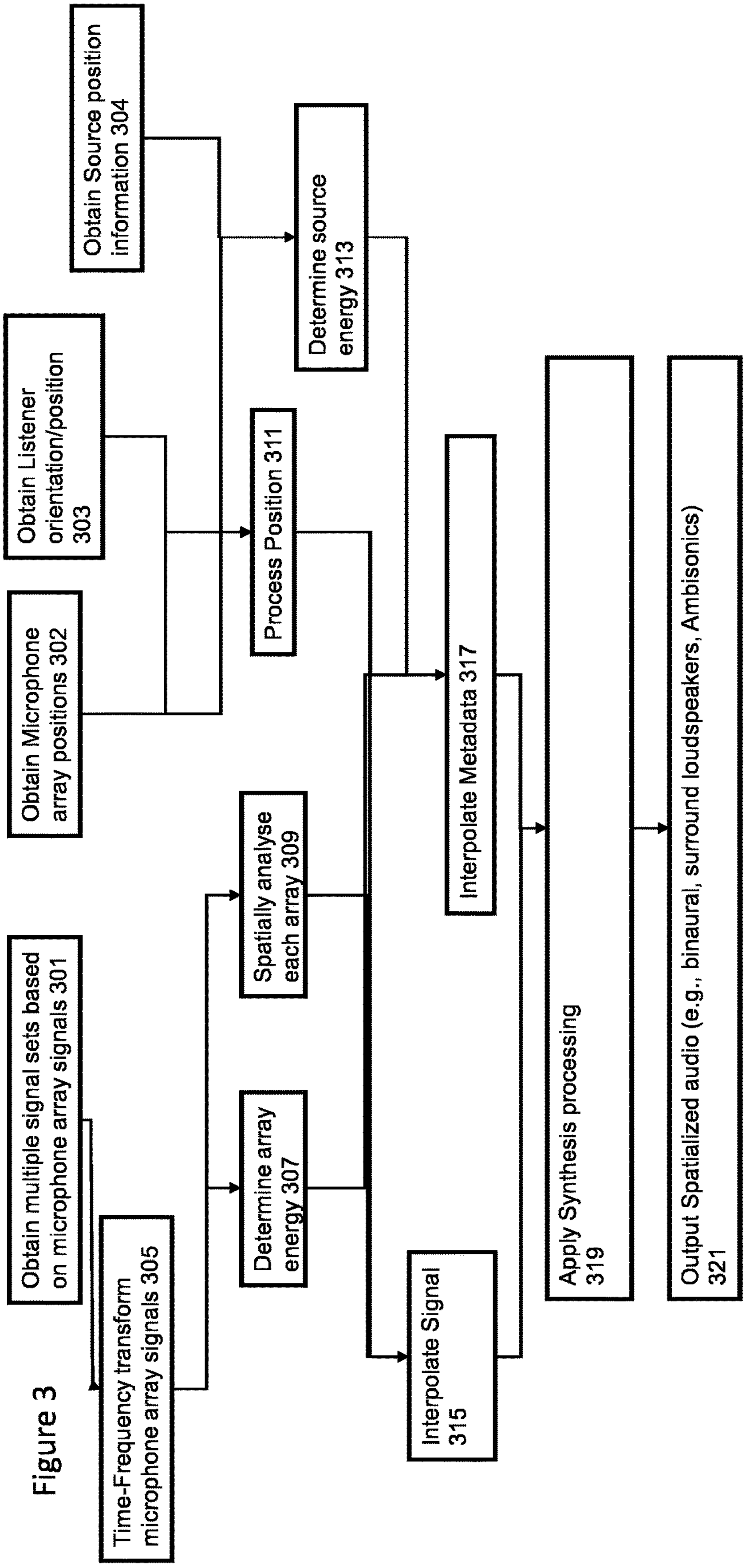
FIG. 3 shows a flow diagram of the operations of the apparatus shown in FIG. 2 according to some embodiments.

With respect to FIG. 3 is shown a flow diagram of the example system as shown in FIG. 2.

The obtaining of multiple signal sets based on microphone array signals is shown in FIG. 3 by step 301.

The time-frequency domain transforming of the microphone array signals is shown in FIG. 3 by step 305.

Having determined the time-frequency domain transformed microphone array signals the array energy can be determined as shown in FIG. 3 by step 307.

Furthermore each array can be spatially analysed as shown in FIG. 3 by step 309.

The obtaining of microphone array positions is shown in FIG. 3 by step 302.

Furthermore the obtaining of listener orientation/position is shown in FIG. 3 by step 303.

Having obtained the microphone array positions and the listener orientation/position then the position can be processed as shown in FIG. 3 by step 311.

The obtaining of source position information is shown in FIG. 3 by step 304.

Following obtaining of the source position information and the microphone array positions the source energy is determined as shown in FIG. 3 by step 313.

Having spatially analysed each array, determined the array energy and processed the position then the signal may be interpolated as shown in FIG. 3 by step 315.

Furthermore the metadata may be interpolated as shown in FIG. 3 by step 317.

Having interpolated the metadata and signal then the spatial audio signals are synthesized as shown in FIG. 3 by step 319.

The spatial audio signals are then output as shown as FIG. 3 by step 321.

Figure 11:
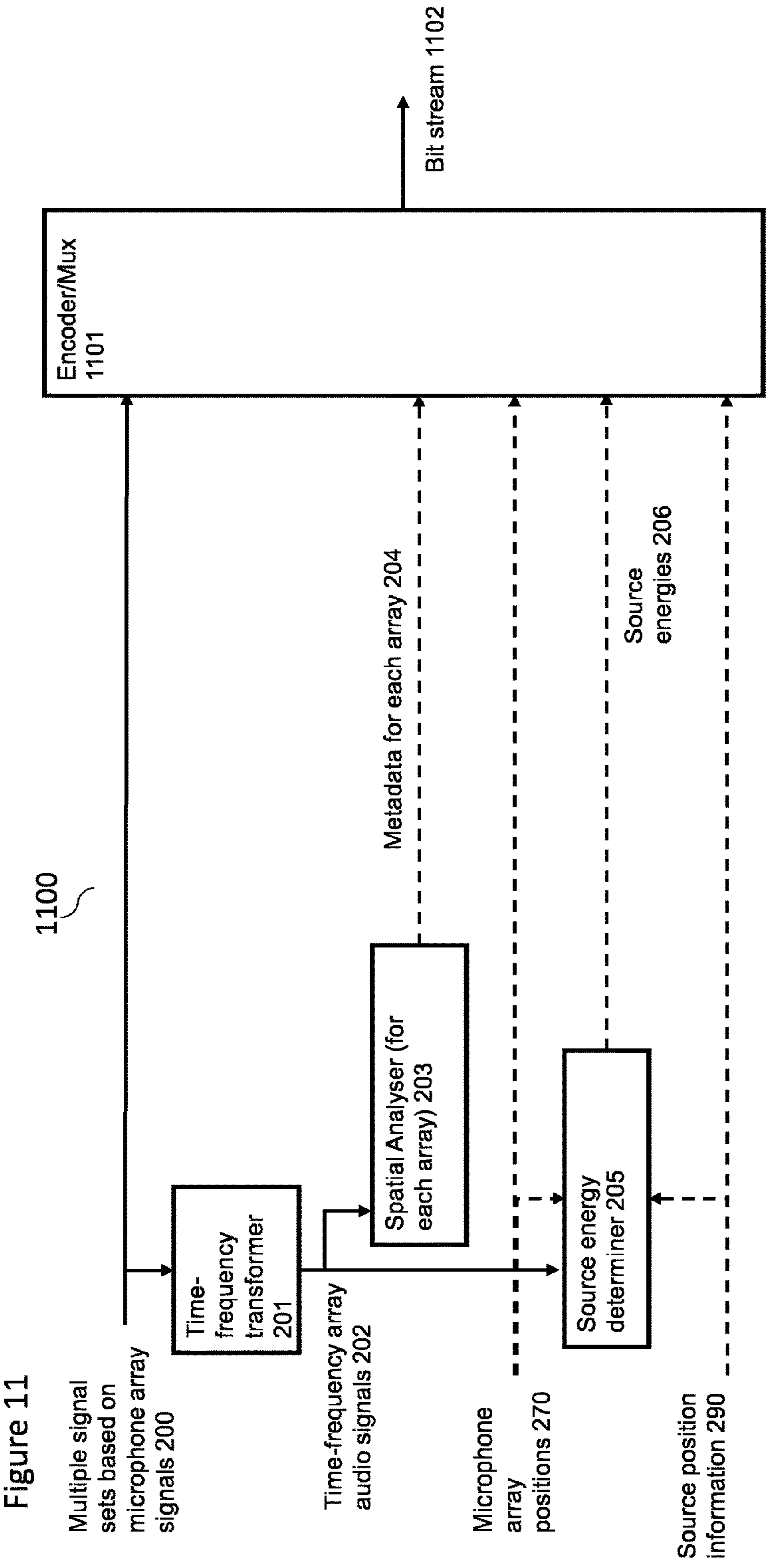
FIG. 11 shows an example arrangement from the point of view of a capture apparatus and/or encoder according to some embodiments.
Figure 13:
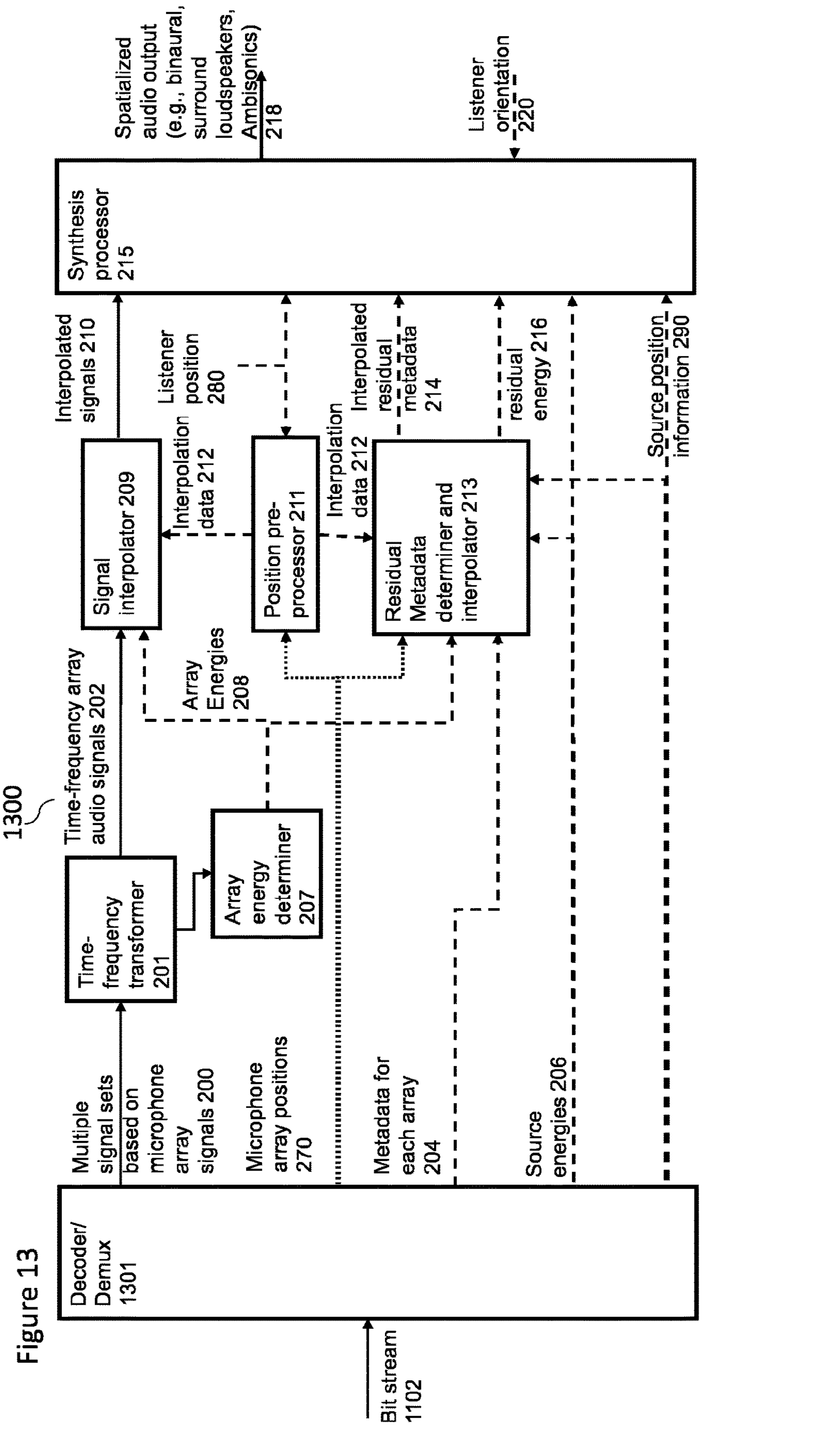
FIG. 13 shows an example arrangement from the point of view of a playback apparatus and/or decoder according to some embodiments.

In some embodiments the system as shown in FIG. 2 can implemented in two separate apparatus, the encoder processor 1100 as shown in FIG. 11 and the decoder processor 1300 as shown in FIG. 13 and the addition of the Encoder/MUX 1101 and DEMUX/Decoder 1301.

In these embodiments the encoder processor 1100 is configured to receive as inputs the multiple signal sets 200, the source position information 290 and the microphone array positions 270. The encoder processor 1100 furthermore comprises the time frequency transformer 201 configured to generate the time-frequency audio signals, the spatial analyser 203 configured to receive the time-frequency audio signals and output the metadata for each array 204. Furthermore the encoder processor 1100 comprises the source energy determiner 205 configured to receive the time-frequency array audio signals 202, the microphone array positions 270 and source position information 290 and generate the source energies 206.

The encoder processor 1100 also comprises an Encoder/MUX 1101 configured to receive the multiple signal sets 200, the metadata for each array 204, the microphone array positions 270, the source position information 290 and the source energies 206. The Encoder/MUX 1001 is configured to apply a suitable encoding scheme for the audio signals, for example, any methods to encode Ambisonic signals that have been described in context of MPEG-H. The encoder/MUX 1001 block may also downmix or otherwise reduce the number of audio channels to be encoded. Furthermore, the Encoder/MUX 1001 may quantize and encode the spatial metadata and the microphone array positions 270, the source position information 290 and the source energies 206 and embed the encoded result to a bit stream 1102 also comprising the encoded audio signals. The bit stream 1102 may further be provided at the same media container with encoded video signals. The Encoder/MUX 1001 then outputs the bit stream 1102. Depending on the employed bit rate, the encoder may have omitted the encoding of some of the signal sets, and if that is the case, it may have omitted encoding the corresponding array positions and metadata (however, they may also be kept in order to use them for metadata interpolation).

Figure 12:
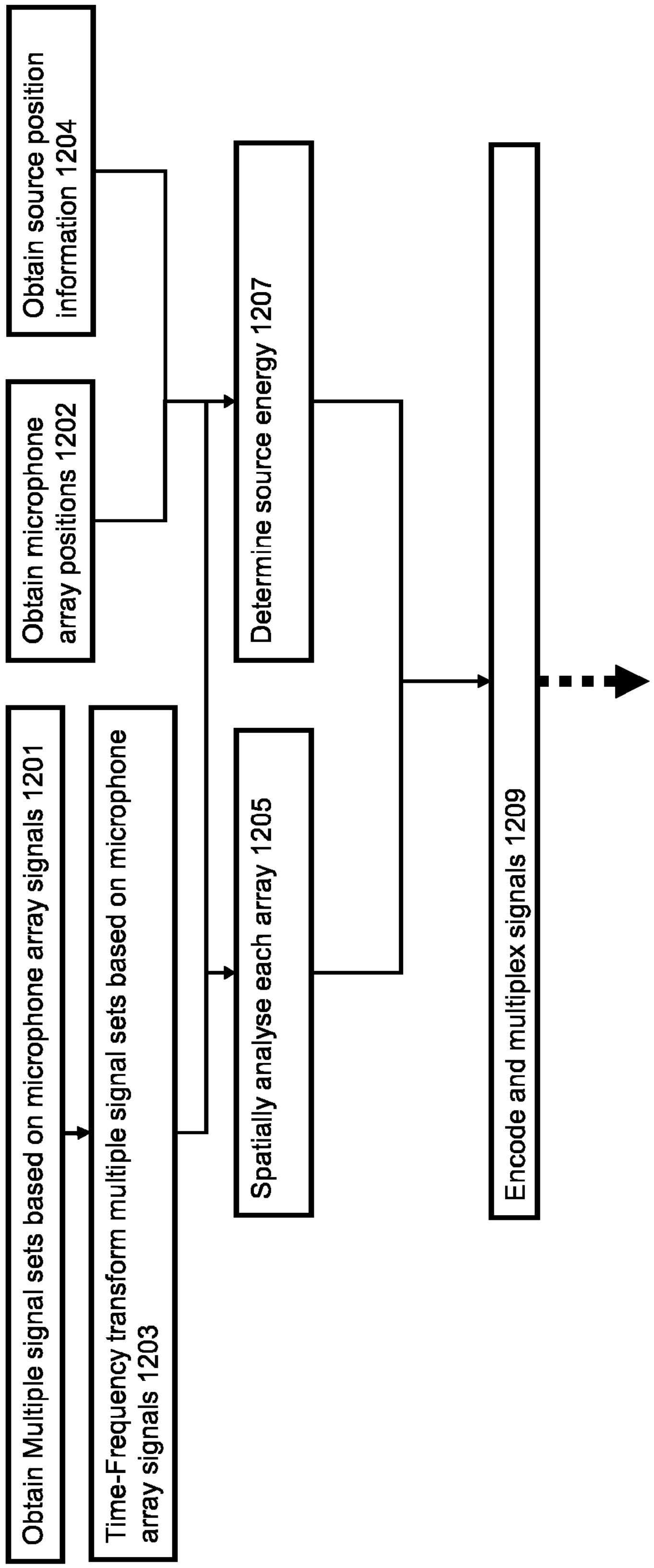
FIG. 12 shows a flow diagram of the operations of the capture apparatus and/or encoder shown in FIG. 11 according to some embodiments.

FIG. 12 shows a flow diagram of a summary of the operations of the encoder processor 1101 shown in FIG. 11.

The encoder is configured to obtain multiple signal sets based on microphone array signals as shown in FIG. 12 by step 1201.

The encoder is then configured to Time-Frequency transform multiple signal sets based on microphone array signals as shown in FIG. 12 by step 1203.

The encoder is then configured to spatially analyse each array as shown in FIG. 12 by step 1205.

The encoder is configured to obtain microphone array positions as shown in FIG. 12 by step 1202.

Furthermore the encoder is configured to obtain source position information as shown in FIG. 12 by step 1204.

The encoder is then configured to determine the source energy as shown in FIG. 12 by step 1207.

The encoder is then configured to encoder and multiplex the determined and obtained signals as shown in FIG. 12 by step 1209.

The decoder processor 1300 comprises a DEMUX/Decoder 1301. The DEMUX/Decoder 1301 is configured to receive the bit stream 1102 and decode and demultiplex the multiple signal sets based on microphone array 200 (and provides them to the time-frequency transformer 201), the microphone array positions 270 (and provides them to the position pre-processor 211 and residual metadata determiner and interpolator 213), the metadata for each array 204 (and provides them to the residual metadata determiner and interpolator 213), the source energies 206 (and provides them to the residual metadata determiner and interpolator 213 and synthesis processor 215), and the source position information 290 (and provides them to residual metadata determiner and interpolator 213 and synthesis processor 215).

The decoder processor 1300 furthermore comprises a time-frequency transformer 201, array energy determiner 207, signal interpolator 209, position pre-processor 211, residual metadata determiner and interpolator 213 and synthesis processor 215 as discussed in detail previously.

Figure 14:
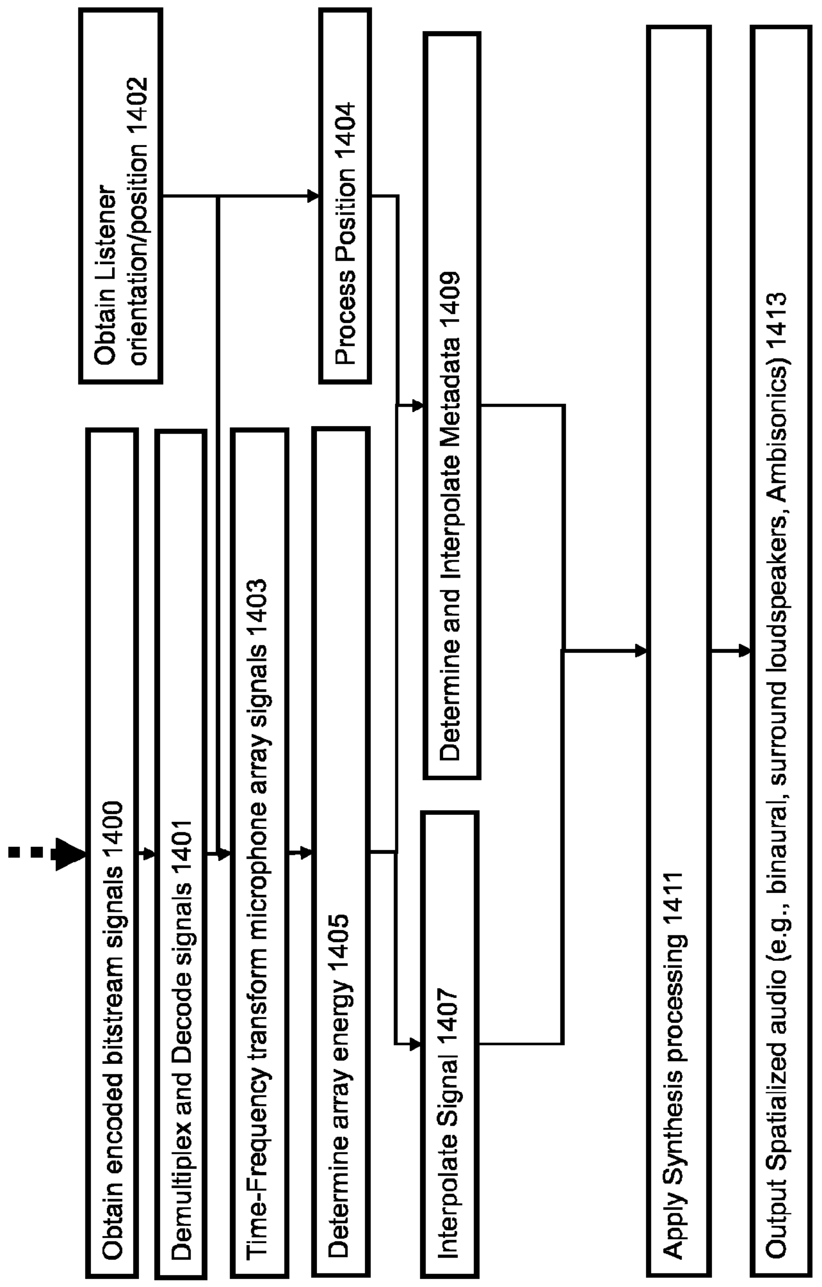
FIG. 14 shows a flow diagram of the operations of the playback apparatus and/or decoder shown in FIG. 13 according to some embodiments.

With respect to FIG. 14 is shown a flow diagram of the operations of the decoder processor as shown in FIG. 13.

The encoded and multiplexed signals may be obtained as shown in FIG. 14 by step 1400.

The encoded and multiplexed signals may then be decoded and demultiplexed as shown in FIG. 14 by step 1401.

The decoded microphone array audio signals are then time-frequency domain transformed as shown in FIG. 14 by step 1403.

The array energy is then determined as shown in FIG. 14 by step 1405.

The listener orientations/positions are obtained as shown in FIG. 4 by step 1402.

Having obtained the listener orientations/positions and decoded/demultiplexed the microphone array positions from the obtained bitstream then the interpolation factors can then be obtained by processing the relative positions as shown in FIG. 14 by step 1404.

Having obtained the interpolation factors by processing the relative positions and the signals/metadata then the method may interpolate the signals as shown in FIG. 14 by step 1407 and determine and interpolate the residual metadata as shown in FIG. 14 by step 1409.

Having determined and interpolated the residual metadata and signals and the listener orientation/position (and having already decoded/demultiplexed the source energies 206 and the source position information) then the method may apply synthesis processing as shown in FIG. 14 by step 1411.

The spatialized audio is output as shown in FIG. 14 by step 1403.

Figure 15:
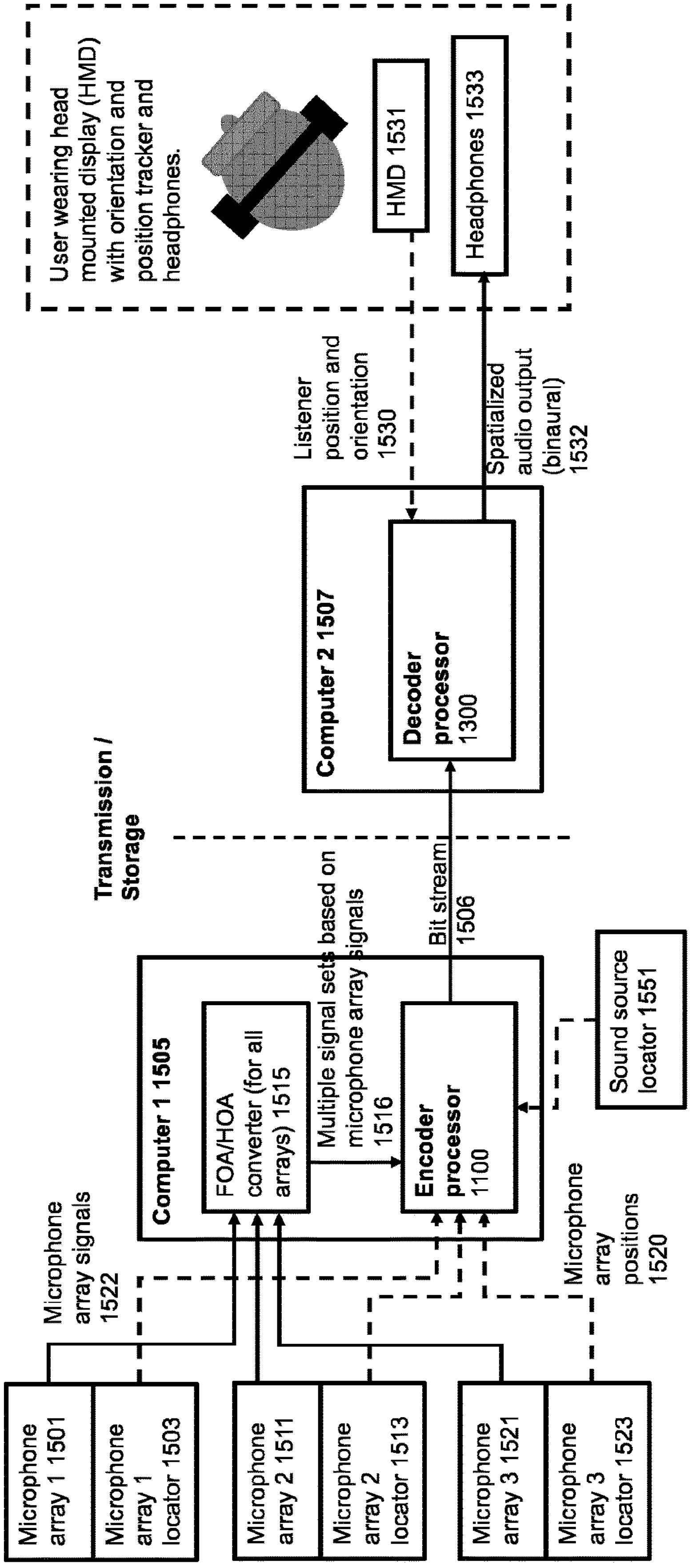
FIG. 15 shows schematically a further view of suitable apparatus for implementing interpolation of audio signals and metadata according to some embodiments.

With respect to FIG. 15 is shown an example application of the encoder and decoder processor of FIGS. 11 and 13.

In this example, there are three microphone arrays, which could for example be spherical arrays with sufficient number of microphones (e.g., 30 or more), or VR cameras (e.g., OZO or similar) with microphones mounted on its surface. Thus is shown microphone array 1 1501, microphone array 2 1511 and microphone array 3 1521 configured to output audio signals to computer 1 1505 (and in this example FOA/HOA converter 1515).

Furthermore each array is equipped also with a locator providing the positional information of the corresponding array. Thus is shown microphone array 1 locator 1503, microphone array 2 locator 1513 and microphone array 3 locator 1523 configured to output location information to computer 1 1505 (and in this example encoder processor 1100).

The system in FIG. 15 further comprises a computer, computer 1 1505 comprising a FOA/HOA converter 1515 configured to convert the array signals to first-order Ambisonic (FOA) or higher-order Ambisonic (HOA) signals. Converting microphone array signals to Ambisonic signals is known and not described in detail herein but if the arrays were for example Eigenmikes, there are available means to convert the microphone signals to an Ambisonic form.

The FOA/HOA converter 1515 outputs the converted Ambisonic signals in the form of Multiple signal sets based on microphone array signals 1516, to the encoder processor 1100 which may operate as the encoder processor 1100 as described above.

The microphone array locator 1503, 1513, 1523 is configured to provide the Microphone array position information to the Encoder processor in computer 1 1505 through a suitable interface, for example, through a Bluetooth connection. In some embodiments the array locator also provides rotational alignment information, which could be provided to rotationally align the FOA/HOA signals at computer 1 1505.

The encoder processor 1100 at computer 1 is further configured to receive a sound source information from a sound source locator 1551. The sound source locator 1551 is configured to provide sound source positions for the encoder processing. The sound source locator can be an automatic system based on, for example, radio-based indoor positioning tags and one or more locator antennas, or a manual input from a sound production engineer. The sound source locator provides sound source positions through a suitable interface to computer 1 1505, such as via Bluetooth, via local area network, using a suitable communication protocol such as UDP. As another example, input via a file I/O can be used as an interface.

The encoder processor 1100 at computer 1 1505 is configured to process the multiple signal sets based on microphone array signals and microphone array positions and provide the encoded bit stream 1506 as an output.

The bit stream 1506 may be stored and/or transmitted, and then the decoder processor 1300 of computer 2 1507 is configured to receive or obtain from the storage the bit stream 1506. The Decoder processor 1300 may also obtain listener position and orientation information from the position/orientation tracker of a HMD (head mounted display) 1531 that the user is wearing. In this example the listener position is 'physical' position, in a physical listening space. However it would be understood that in some embodiments the listener position is a 'virtual' position for example provided by some user input means. For example a mouse, joystick or other pointer device may indicate a position on a screen indicating a virtual listening scene position. Based on the bit stream 1506 and listener position and orientation information 1530, the decoder processor of computer 2 1507 is configured to generate the binaural spatialized audio output signal 1532 and provide them, via a suitable audio interface, to be reproduced over the headphones 1533 the user is wearing.

In some embodiments, computer 2 1507 is the same device as computer 1 1505, however, in a typical situation they are different devices or computers. A computer in this context may refer to a desktop/laptop computer, a processing cloud, a game console, a mobile device, or any other device capable of performing the processing described in the present invention disclosure.

In some embodiments, the bit stream 1506 is an MPEG-I bit stream. In some other embodiments, it may be any suitable bit stream.

In the above embodiments the spatial parametric analysis of Directional Audio Coding can be replaced by an adaptive beamforming approach. The adaptive beamforming approach may for example be based on the COMPASS method outlined in Archontis Politis, Sakari Tervo, and Ville Pulkki. "COMPASS: Coding and Multidirectional Parameterization of Ambisonic Sound Scenes." in IEEE Int. Conf, of Acoustics, Speech, and Signal Processing (ICASSP), 2018.

The methods presented above assume knowing the positions of the most prominent sources (e.g., via location trackers). However, in alternative embodiments, the positions of the sources can also be estimated using the microphone-array signals. Especially, if the position estimation can be performed non-realtime (e.g., analysing the whole recording), reliable estimation can be assumed.

In case of estimated positions, addition of a reliability factor may be useful. In that case, the direct sound energy estimates could be weighted by this factor. Let us assume having a reliability factor $\Xi_{l,src}(n)$ for each source (having values between 0 and 1), where 1 denotes high reliability of having the sound source in the corresponding direction, and 0 denotes low reliability. Then, the Source energies $E_{l,src}(k, n)$ can, e.g., be estimated using $$E_{l,src}(k,n) = E'_{l,src}(k,n) d_{l_j l_j}^2 \Xi_{l,src}(n).$$

In alternative embodiments, it is possible edit the positions (and/or some other features) of the extracted direct sound components. E.g., if there is a certain sound source in a certain position, and its position is provided to the processing, it is possible to edit the position of the source to some another position, so that the sound source will be rendered to the edited position.

In some embodiments, strong early reflections of prominent sources can also be used as separate sources. In particular, the MPEG-I Audio scene can contain a description of the scene geometry as a mesh. Based on the scene geometry one or more image sources can be determined for the most prominent sources and using the image sources one or more early reflection positions can be determined as additional sound sources. The benefit of this is that prominent early reflections can be rendered more sharply as they are considered as prominent sources. During rendering, the same geometrical model is used to update the reflection positions depending on the user position and the positions of the sources corresponding to reflections are updated accordingly. Otherwise the processing for reflection sound sources is the same as for normal sound sources.

In some embodiments, the interpolation of the residual metadata may use energy weighting when determining the interpolated directions and ratios $$v_j(k,n) = \begin{bmatrix} \cos(\theta_{j,res}(k,n))\cos(\varphi_{j,res}(k,n)) \\ \sin(\theta_{j,res}(k,n))\cos(\varphi_{j,res}(k,n)) \\ \sin(\varphi_{j,res}(k,n)) \end{bmatrix} r_{j,res}(k,n) E_{j,res}(k,n)$$

Then, these vectors are averaged by $$v(k,n) = w_1 v_{j_{list,1}}(k,n) + w_2 v_{j_{list,2}}(k,n) + w_3 v_{j_{list,3}}(k,n)$$

Then, denoting $$v(k,n) = [v_1(k,n) \;\; v_2(k,n) \;\; v_3(k,n)]^T,$$

the interpolated residual metadata is obtained by $$\theta'(k,n) = a\tan 2\,(v_2(k,n), v_1(k,n))$$

$$\varphi'(k,n) = a\tan 2\left(v_3(k,n), \sqrt{v_1^2(k,n) + v_2^2(k,n)}\right)$$

$$r'(k,n) = \frac{\sqrt{v_1^2(k,n) + v_2^2(k,n) + v_3^2(k,n)}}{E_{res}(k,n)}$$

In some further embodiments, the interpolation of the residual metadata may be performed by interpolating the residual intensities by $$i_{res}(k,n) = w_1 i_{j_{list,1},res}(k,n) + w_2 i_{j_{list,2},res}(k,n) + w_3 i_{j_{list3},res}(k,n)$$

Then, the interpolated residual metadata is obtained by $$\theta'(k,n) = a\tan 2\,(i_{2,res}(k,n), i_{1,res}(k,n))$$

$$\varphi'(k,n) = a\tan 2\left(i_{3,res}(k,n), \sqrt{i_{1res}^2(k,n) + i_{2res}^2(k,n)}\right)$$

$$r'(k,n) = \frac{\sqrt{i_{res}^H(k,n) i_{res}(k,n)}}{E_{res}(k,n)}$$

where $i_{1,res}(k,n)$, $i_{2,res}(k,n)$, $i_{3,res}(k,n)$ are the entries of vector $i_{res}(k,n)$.

In some alternative embodiments, the prototype signal generator may generate different kind of prototype signals than the cardioid signals presented above. E.g., it may generate binaural signals by applying a static HOA-to-binaural matrix on the input HOA signals (after rotation has been applied on the HOA signals based on the "Head orientation"). This may improve the quality as the features of the generated intermediate binaural signals may be closer to the target binaural signals than the cardioid signals.

In some alternative embodiments, the target covariance matrix determiner may determine the target covariance matrix in a different way. For example it may first determine combined directions, direct-to-total energy ratios, and energies, and then determine the target covariance matrix using them, e.g., by $C_y(k,n)=E_{comb}(k,n)\,[r_{comb}(k,n)h(\theta_{comb}(k,n), \varphi_{comb}(k,n),k)h^H(\theta_{comb}(k,n),\varphi_{comb}(k,n),k)+(1-r_{comb}(k,n))C_D(k)]$.

In the above the terms residual energy value or residual energy may be understood to more generally refer to a residual value.

Similarly source energy values may in some embodiments be values associated with the source energy values, such as amplitude values or other prominence related values.

Figure 16:
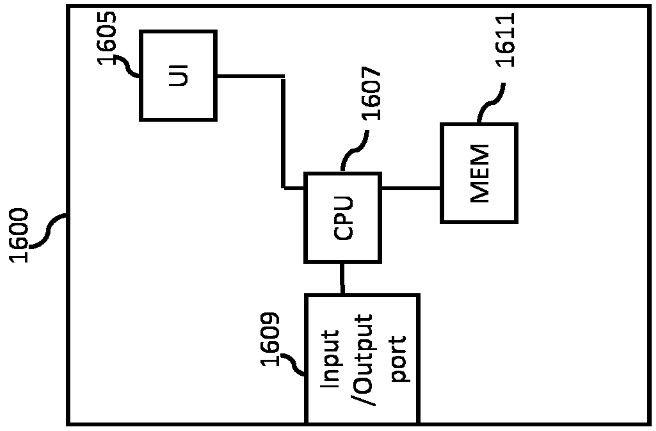
FIG. 16 shows schematically an example device suitable for implementing the apparatus shown.

With respect to FIG. 16 an example electronic device which may be used as the computer, encoder processor, decoder processor or any of the functional blocks described herein is shown. The device may be any suitable electronics device or apparatus. For example in some embodiments the device 1600 is a mobile device, user equipment, tablet computer, computer, audio playback apparatus, etc.

In some embodiments the device 1600 comprises at least one processor or central processing unit 1607. The processor 1607 can be configured to execute various program codes such as the methods such as described herein.

In some embodiments the device 1600 comprises a memory 1611. In some embodiments the at least one processor 1607 is coupled to the memory 1611. The memory 1611 can be any suitable storage means. In some embodiments the memory 1611 comprises a program code section for storing program codes implementable upon the processor 1607. Furthermore in some embodiments the memory 1611 can further comprise a stored data section for storing data, for example data that has been processed or to be processed in accordance with the embodiments as described herein. The implemented program code stored within the program code section and the data stored within the stored data section can be retrieved by the processor 1607 whenever needed via the memory-processor coupling.

In some embodiments the device 1600 comprises a user interface 1605. The user interface 1605 can be coupled in some embodiments to the processor 1607. In some embodiments the processor 1607 can control the operation of the user interface 1605 and receive inputs from the user interface 1605. In some embodiments the user interface 1605 can enable a user to input commands to the device 1600, for example via a keypad. In some embodiments the user interface 1605 can enable the user to obtain information from the device 1600. For example the user interface 1605 may comprise a display configured to display information from the device 1600 to the user. The user interface 1605 can in some embodiments comprise a touch screen or touch interface capable of both enabling information to be entered to the device 1600 and further displaying information to the user of the device 1600.

In some embodiments the device 1600 comprises an input/output port 1609. The input/output port 1609 in some embodiments comprises a transceiver. The transceiver in such embodiments can be coupled to the processor 1607 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1609 may be configured to transmit/receive the audio signals, the bitstream and in some embodiments perform the operations and methods as described above by using the processor 1607 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus, comprising:

at least one processor; and at least one memory storing instructions that, when executed with the at least one processor, cause the apparatus at least to:

obtain two or more audio signal sets, wherein the two or more audio signal sets are associated with a respective audio signal set positions;

obtain, for at least one parameter associated with the two or more audio signal sets, at least one parameter value for at least two of the two or more audio signal sets;

obtain the respective audio signal set positions associated with the at least two of the two or more audio signal sets;

obtain a listener position, wherein the listener position is configured to define at least partially a listener within an audio environment, wherein the audio environment comprises positions between and around the respective audio signal set positions associated with the two or more audio signal sets;

obtain sound source position information;

obtain values related to sound source energies associated with the sound source position information;

generate at least one audio signal based on at least one audio signal from at least one of the two or more audio signal sets based on the respective audio signal set positions associated with the at least two of the two or more audio signal sets and the listener position;

generate at least one modified parameter value and a residual value based on the obtained at least one parameter value for the at least two of the two or more audio signal sets, the respective audio signal set positions associated with the at least two of the two or more audio signal sets, the sound source position information, the values related to the sound source energies, and the listener position; and process the at least one audio signal based on the at least one modified parameter value, the residual value, the sound source position information, and the values related to the sound source energies associated with the sound source position information to generate a spatial audio output.

2. The apparatus as claimed in claim 1, wherein the instructions, when executed with the at least one processor, cause the apparatus to obtain the two or more audio signal sets from microphone arrangements, wherein the microphone arrangements are at respective positions and comprise one or more microphones.

3. The apparatus as claimed in claim 1, wherein the two or more audio signal sets are associated with respective audio signal set orientations and the instructions, when executed with the at least one processor, cause the apparatus to obtain the respective audio signal set orientations of the two or more audio signal sets, wherein the generated at least one audio signal is further based on the respective audio signal set orientations associated with the two or more audio signal sets, and wherein the at least one modified parameter value is further based on the respective audio signal set orientations associated with the two or more audio signal sets.

4. The apparatus as claimed in claim 1, wherein the instructions, when executed with the at least one processor, cause the apparatus to obtain a listener orientation, wherein the listener orientation is configured to define the listener within an at least partially six-degrees-of-freedom environment and to:

generate the at least one modified parameter value further based on the listener orientation; and process the at least one audio signal based on the at least one modified parameter value, the residual value, the sound source position information, and the values related to the sound source energies associated with the sound source position information to generate the spatial audio output configured to process the at least one audio signal further based on the listener orientation.

5. The apparatus as claimed in claim 1, wherein the instructions, when executed with the at least one processor, cause the apparatus to obtain control parameters based on the respective audio signal set positions associated with the at least two of the two or more audio signal sets and the listener position, to generate the at least one audio signal based on the at least one audio signal from the at least one of the two or more audio signal sets based on the respective audio signal set positions associated with the at least two of the two or more audio signal sets, and to control the listener position based on the control parameters.

6. The apparatus as claimed in claim 5, wherein the instructions, when executed with the at least one processor, cause the apparatus to generate the at least one modified parameter value based on the control parameters.

7. The apparatus as claimed in claim 5, wherein the instructions, when executed with the at least one processor, cause the apparatus to one of:

identify at least three of the two or more audio signal sets within which the listener position is located and generate weights associated with the at least three of the two or more audio signal sets based on the respective audio signal set positions and the listener position; and identify two or more of the two or more audio signal sets closest to the listener position and generate weights associated with the two or more of the two or more audio signal sets based on the respective audio signal set positions and a perpendicular projection of the listener position from a line or plane between the two or more of the two or more audio signal sets.

8. The apparatus as claimed in claim 7, wherein the instructions, when executed with the at least one processor, cause the apparatus to one of:

combine two or more audio signals from the two or more audio signal sets based on the weights;

select one or more audio signal from one of the two or more audio signal sets based on which of the two or more audio signal sets is closest to the listener position; and select one or more audio signal from one of the two or more audio signal sets based on which of the two or more audio signal sets is closest to the listener position and further switching threshold.

9. The apparatus as claimed in claim 7, wherein the instructions, when executed with the at least one processor, cause the apparatus to combine the obtained at least one parameter value for the at least two of the two or more audio signal sets based on the weights.

10. The apparatus as claimed in claim 1, wherein the instructions, when executed with the at least one processor, cause the apparatus to generate at least one of:

a binaural audio output comprising two audio signals for at least one of headphones or earphones; or a multichannel audio output comprising at least two audio signals for a multichannel speaker set.

11. The apparatus as claimed in claim 1, wherein the at least one parameter value comprises at least one of:

at least one direction value;

at least one direct-to-total ratio associated with at least one direction value;

at least one spread coherence associated with at least one direction value;

at least one distance associated with at least one direction value;

at least one surround coherence;

at least one diffuse-to-total ratio; or at least one remainder-to-total ratio.

12. The apparatus as claimed in claim 1, wherein the at least two of the two or more audio signal sets comprises at least two audio signals, and the instructions, when executed with the at least one processor, causes the apparatus to spatially analyse the at least two audio signals from the two or more audio signal sets to determine the at least one parameter value.

13. The apparatus as claimed in claim 1, wherein the instructions, when executed with the at least one processor, cause the apparatus to receive or retrieve the at least one parameter value for the at least two of the two or more audio signal sets.

14. The apparatus as claimed in claim 1, wherein the sound source position information is based on at least one prominent sound source.

15. The apparatus as claimed in claim 14, wherein the at least one prominent sound source is a sound source with an energy greater than a threshold value.

16. The apparatus as claimed in claim 1, wherein the instructions, when executed with the at least one processor, cause the apparatus to:

receive at least one user input defining the sound source position information;

receive position tracker information defining the sound source position information; and determine the sound source position information based on the two or more audio signal sets.

17. The apparatus as claimed in claim 1, wherein the values related to the sound source energies comprise one of:

sound source energy values;

sound source amplitude values;

sound source level values; and sound source prominence values.

18. The apparatus as claimed in claim 1, wherein the residual value comprises a residual energy value.

19. The apparatus as claimed in claim 1, wherein the instructions, when executed with the at least one processor, cause the apparatus to select the at least one audio signal from at least one of the two or more audio signal sets based on the respective audio signal set positions associated with the at least two of the two or more audio signal sets and the listener position.

20. A method for an apparatus, the method comprising:

obtaining two or more audio signal sets, wherein the two or more audio signal sets are associated with respective audio signal set positions;

obtaining, for at least one parameter associated with the two or more audio signal sets, at least one parameter value for at least two of the two or more audio signal sets;

obtaining the respective audio signal set positions associated with the at least two of the two or more audio signal sets;

obtaining a listener position, wherein the listener position is configured to define at least partially a listener within an audio environment, wherein the audio environment comprises positions between and around the respective audio signal set positions associated with the two or more audio signal sets;

obtaining sound source position information;

obtaining values related to sound source energies associated with the sound source position information;

generating at least one audio signal based on at least one audio signal from at least one of the two or more audio signal sets based on the respective audio signal set positions associated with the at least two of the two or more audio signal sets and the listener position;

generating at least one modified parameter value and a residual value based on the obtained at least one parameter value for the at least two of the two or more audio signal sets, the respective audio signal set positions associated with the at least two of the two or more audio signal sets, the sound source position information, the values related to the sound source energies, and the listener position; and processing the at least one audio signal based on the at least one modified parameter value, the residual value, the sound source position information, and the values related to the sound source energies associated with the sound source position information to generate a spatial audio output.

* * * * *